US00RE48231E

(19) United States
(12) Reissued Patent
Zhang et al.

(10) Patent Number: US RE48,231 E
(45) Date of Reissued Patent: Sep. 29, 2020

(54) BLOWER SYSTEM AND METHOD FOR CONTROLLING THE SAME

(71) Applicant: Zhongshan Broad-Ocean Motor Co., Ltd., Zhongshan (CN)

(72) Inventors: Zheng Zhang, Zhongshan (CN); Jizhong Wang, Zhongshan (CN); Mingpan Pan, Zhongshan (CN); Yong Zhao, Zhongshan (CN); Yiqiao Zhou, Zhongshan (CN); Ronghua Bi, Zhongshan (CN)

(73) Assignee: ZHONGSHAN BROAD-OCEAN MOTOR CO., LTD., Zhongshan (CN)

(21) Appl. No.: 15/385,838

(22) Filed: Dec. 20, 2016

Related U.S. Patent Documents

Reissue of:
(64) Patent No.: 8,933,656
Issued: Jan. 13, 2015
Appl. No.: 13/845,146
Filed: Mar. 18, 2013

(30) Foreign Application Priority Data

May 31, 2012 (CN) ..... 2012 1 0179372

(51) Int. Cl.
*H02K 21/14* (2006.01)
*H02P 21/14* (2016.01)
(Continued)

(52) U.S. Cl.
CPC ..... *H02K 21/14* (2013.01); *H02K 21/16* (2013.01); *H02P 6/28* (2016.02); *H02P 21/14* (2013.01);
(Continued)

(58) Field of Classification Search
CPC ..... H02K 1/276; H02K 29/03; H02K 19/103; H02K 21/046; H02K 21/48; H02P 6/182; H02P 21/0021
(Continued)

(56) References Cited

U.S. PATENT DOCUMENTS 4,361,791 A * 11/1982 Plunkett ..... H02P 25/024 318/696
4,649,331 A * 3/1987 Jahns ..... H02P 25/024 318/723
(Continued)

FOREIGN PATENT DOCUMENTS

CN 1829059 A 9/2006
CN 102111025 A 6/2011
(Continued)

*Primary Examiner* — Anjan K Deb
(74) *Attorney, Agent, or Firm* — Matthias Scholl P.C.; Matthias Scholl

(57) ABSTRACT

A blower system, including a permanent magnet motor and a wind wheel. The permanent magnet motor includes a stator assembly, a rotor assembly, and a motor controller. The rotor assembly includes a salient pole rotor including a rotor core and magnets embedded in the rotor core. The motor controller includes a microprocessor, a frequency inverter, and a sensor unit. The sensor unit inputs a phase current or phase currents, a phase voltage, and a DC bus voltage into the microprocessor. The microprocessor outputs a signal to control the frequency inverter which is connected to a winding of the stator assembly. The ratio between an air gap of the motor and the thickness of the magnets ranges from 0.03 to 0.065, and the ratio between the length of a pole arc and the length of the magnets ranges from 0.8 to 1.0.

11 Claims, 18 Drawing Sheets

(Amended)

(51) Int. Cl.
*H02P 6/28* (2016.01)
*H02K 21/16* (2006.01)
*H02K 1/27* (2006.01)

(52) U.S. Cl.
CPC ..... *H02P 21/141* (2013.01); *H02K 1/2773* (2013.01); *H02K 2213/03* (2013.01)

(58) Field of Classification Search
USPC ..... 318/400.02, 400.09, 400.11, 400.39; 310/156.46, 156.55, 156.56
See application file for complete search history.

(56) References Cited

U.S. PATENT DOCUMENTS 4,888,513 A * 12/1989 Fratta ..... 310/216.017
5,146,127 A * 9/1992 Smith ..... 310/166
5,272,429 A * 12/1993 Lipo et al. ..... 318/808
5,315,198 A * 5/1994 Toroh ..... 310/162
5,592,058 A * 1/1997 Archer et al. ..... 318/400.09
5,652,493 A * 7/1997 Hendershot, Jr. ..... 318/701
5,739,620 A * 4/1998 Wu et al. ..... 310/216.092
5,773,908 A * 6/1998 Stephens et al. ..... 310/216.094
5,844,344 A * 12/1998 Uetake et al. ..... 310/156.49
6,034,458 A * 3/2000 Uetake et al. ..... 310/156.49
6,044,737 A * 4/2000 Yao et al. ..... 83/13
6,046,554 A * 4/2000 Becerra ..... 318/400.34
6,104,113 A * 8/2000 Beifus ..... 310/68 B
RE37,576 E * 3/2002 Stephens et al. ..... 310/254.1
6,841,969 B1 * 1/2005 Schulz ..... H02P 21/13 318/610
6,850,031 B2 * 2/2005 Nakata et al. ..... 318/801
6,897,591 B2 * 5/2005 Peachee et al. ..... 310/166
7,030,532 B2 * 4/2006 Kobayashi et al. ..... 310/168
7,068,001 B2 * 6/2006 Okumatsu et al. ..... 318/400.39
7,183,684 B2 * 2/2007 Miyashita ..... H02K 1/278 310/156.38
7,304,452 B2 * 12/2007 Nagai ..... H02P 6/182 318/432
7,474,027 B2 * 1/2009 Kikuchi et al. ..... 310/156.53
7,514,887 B2 * 4/2009 Mullin et al. ..... 318/400.11
7,982,421 B2 * 7/2011 Negoro et al. ..... 318/454
8,040,010 B2 * 10/2011 Kamiya et al. ..... 310/156.57
8,084,970 B2 * 12/2011 Mullin et al. ..... 318/400.11
8,232,751 B2 * 7/2012 Iwaji et al. ..... 318/400.02
8,242,654 B2 * 8/2012 Yamada et al. ..... 310/156.55
2002/0149342 A1 * 10/2002 Nakata et al. ..... 318/801
2003/0233200 A1 12/2003 Petrovic et al.
2004/0135533 A1 * 7/2004 Harakawa ..... H02P 21/00 318/609
2004/0245949 A1 * 12/2004 Ueda et al. ..... 318/254
2006/0022628 A1 * 2/2006 Okumatsu et al. ..... 318/437
2006/0131976 A1 * 6/2006 Kikuchi et al. ..... 310/156.46
2006/0284581 A1 * 12/2006 Mullin et al. ..... 318/362
2007/0145941 A1 * 6/2007 Asada et al. ..... 318/811
2008/0157710 A1 * 7/2008 Tobari ..... H02P 21/22 318/801
2009/0160384 A1 * 6/2009 Mullin et al. ..... 318/400.34
2009/0230802 A1 * 9/2009 Kamiya et al. ..... 310/156.53
2010/0066284 A1 * 3/2010 Iwaji et al. ..... 318/400.02
2010/0171455 A1 * 7/2010 Schulz ..... H02P 6/183 318/400.33
2010/0194322 A1 * 8/2010 Negoro et al. ..... 318/454
2010/0308680 A1 * 12/2010 Yamada et al. ..... 310/156.54
2011/0012461 A1 * 1/2011 Tomigashi ..... H02K 1/276 310/156.01
2011/0241599 A1 * 10/2011 Nashiki ..... B60L 3/003 318/724
2011/0248565 A1 * 10/2011 Helle ..... H02P 9/102 307/31
2012/0146446 A1 * 6/2012 Lin et al. ..... 310/162
2012/0187877 A1 * 7/2012 Yamagiwa et al. ..... 318/400.02
2012/0274160 A1 * 11/2012 Hino et al. ..... 310/54
2013/0069568 A1 * 3/2013 Krefta ..... H02P 21/06 318/400.02
2013/0265013 A1 * 10/2013 Cao ..... H02P 21/12 322/99
2013/0300249 A1 * 11/2013 Omura et al. ..... 310/216.092
2013/0307450 A1 * 11/2013 Fuller et al. ..... 318/400.3
2014/0077738 A1 * 3/2014 Iwaji et al. ..... 318/400.36

FOREIGN PATENT DOCUMENTS

CN 102157998 A 8/2011
GB 2135832 A * 9/1984 ..... H02K 1/02

* cited by examiner (Amended)

(Amended)

(Amended)

(Amended)

(Amended)

(Amended)

BLOWER SYSTEM AND METHOD FOR CONTROLLING THE SAME

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATIONS

Pursuant to 35 U.S.C. § 119 and the Paris Convention Treaty, this application claims the benefit of Chinese Patent Application No. 201210179372.6 filed May 31, 2012, the contents of which, including any intervening amendments thereto, are incorporated herein by reference. Inquiries from the public to applicants or assignees concerning this document or the related applications should be directed to: Matthias Scholl P.C., Attn.: Dr. Matthias Scholl Esq., 14781 Memorial Drive, Suite 1319, Houston, Tex. 77079.

BACKGROUND OF THE INVENTION

1. Field of the Invention

The invention relates to a blower system and a method for controlling the same.

2. Description of the Related Art

Variable speed blowers are widely used for heating, ventilation, and air control (HVAC). The impellers of the blower rotate under the drive of a variable speed permanent magnetic motor, and the permanent magnetic motor is driven by an electric control system, that is, a motor controller. As shown in a block diagram of a current variable speed blower system of FIG. 1, the system includes an HVAC product controller, a motor controller, a permanent magnetic motor, and a blower. The HVAC product controller, which is commonly a high level product control panel, outputs an input command to control the operation of the whole product. The input command includes different operation modes of the motor, such as a constant torque mode, a constant rotational speed mode, or a constant air volume mode.

The motor controller includes a microprocessor that is used to receive the input commands and to operate the motor in a torque control mode, or a speed control mode, or in a more advanced mode, for example, air volume control mode. The motor controller further includes a frequency inverter and a sensing circuit. The frequency inverter produces a pulse width modulation (PWM) wave corresponding to different operation modes, and energizes a three-phase winding of a stator. The microprocessor detects operating current and voltage of the motor and receives feedback information through the sensing circuit, and sends out a specific control command to control the operation of the motor.

Conventional variable speed blowers employ a rotor including surface-mounted magnetic tiles. FIG. 2 shows a characteristic curve of the torque-speed of a typical variable speed blower. When the rotational speed of the motor is increased, the torque is required to increase. Thus, when the rotational speed reaches a maximum value, the corresponding torque requires a maximum torque. As shown in FIG. 2, in an operating position W1 with the maximum rotational speed S1, the rotor has the maximum torque T1. For a motor including surface mounted permanent magnets, the operating position W1 is a critical point where the frequency inverter is saturated, because the maximum rotational speed requires the maximum torque, which in turn requires a saturated voltage.

When designing a motor, the required rated torque and the rotational speed are generally considered, as shown in the curve of FIG. 2. However, optimizing the controlling strategies is seldom mentioned to extend the maximum rotational speed and torque of a motor. Furthermore, most of the motors have position sensors, thereby resulting in high material and production costs, and potential circuit failure and system efficiency reduction.

Currently, a typical motor controller employs a sensorless vector control mode, and focuses on the current vector control. However, the patent does not disclose any descriptions about using a control strategy combining the saliency of the salient pole rotor with the high flux density to improve the torque density and lower the production cost; or descriptions about the switch of a torque current control module or a direct stator flux vector control (SFVC) module according to the motor operation to improve the efficiency and lower the production cost.

SUMMARY OF THE INVENTION

In view of the above-described problems, it is one objective of the invention to provide a blower system. In the same rated rotational speed and torque, the blower system can lower the manufacturing cost; optimize the performance, save the energy consumption.

To achieve the above objective, in accordance with one embodiment of the invention, there is provided a blower system comprising a permanent magnet motor and a wind wheel driven by the permanent magnet motor. The permanent magnet motor comprises a stator assembly comprising a winding, a rotor assembly, and a motor controller. The rotor assembly comprises a salient pole rotor comprising a rotor core and magnets embedded in the rotor core. The motor controller employs a sensorless vector control mode; the motor controller comprises a microprocessor, a frequency inverter, a sensor unit, and other related peripheral circuits. The sensor unit senses a phase current or phase currents, a phase voltage, and a DC bus voltage into the microprocessor. The microprocessor outputs a command signal to control the frequency inverter. The frequency inverter is connected to the windings of the stator assembly. A unique rotor design in structure dimensions is critical to produce the amplitude and shape of motor airgap flux density waveform. Specifically, It is requires that a ratio between an air gap of the motor and a thickness of the magnets ranges from 0.03 to 0.065, and a ratio between a length of a pole arc and a length of the magnets ranges from 0.8 to 1.0.

In a class of this embodiment, the salient pole rotor comprises a rotor core and a permanent magnet, the rotor core comprises an annular ring having a central axial bore and a plurality of magnetic induction blocks protruding outwards from an outer side of the annular ring; between two adjacent magnetic induction blocks is formed a radial recess for receiving the permanent magnets; and a hook block protrudes from the magnetic induction blocks at both sides of an opening of the radial recess.

In a class of this embodiment, the section of an outer side surface of the magnetic induction blocks is a circular-arc line and the outer side surface employs a point with a distance deviating from the center of the central axial bore as a center of circle.

In a class of this embodiment, the number of magnetic poles of the rotor is 8, 10, or 12.

Advantages of the blower system are summarized below:

1) The system employs a structure of salient pole rotor, due to the saliency of the motor, the ratio between the air gap and the thickness of the magnets ranges from 0.03 to 0.065; the saliency $L_q/L_d$ of the salient pole rotor is 1.3-1.7, the length ratio between the pole arc and the magnets is 0.8-1.0. Based on the magnetic flux gathering effect generated by two permanent magnets having the same poles, the surface air gap flux density of the salient pole rotor ranges from 0.6 to 0.8 Tesla. By improving the torque density and improving the flux density through the salient pole structure or by substituting the ferrite magnets with the original Nd—Fe—B magnets, the production costs can be reduced meanwhile the motor performance is remained.
2) The control strategy increases the output torque due to the contribution of the reluctance torque. Under the flux weakening control, the torque is employed to increase the torque and the rotational speed, the operating position of the permanent magnet motor is initiated from W1 to W2. Correspondingly, the output torque T is increased from T1 to T2, and the rotational speed S is increased from S1 to S2. Thus, the motor performance is improved, in other words, the blower system has low production cost and is energy-saving.
3) The invention employs a sensorless vector control mode, thus, the production cost is further decreased.

It is another objective of the invention to provide a method for controlling a blower system. The method can enlarge the torque and the rotational speed, in another word, it can lower the manufacturing cost, optimize the performance, and save the energy consumption.

A first technical scheme of the method for controlling a blower system is summarized herein below:

A method for controlling a blower system, the system comprising a permanent magnet motor and a wind wheel driven by the permanent magnet motor; the permanent magnet motor comprising a stator assembly comprising a winding, a rotor assembly, and a motor controller; the rotor assembly being a salient pole rotor comprising a rotor core and magnets embedded in the rotor core; the motor controller employing a sensorless vector control mode, the motor controller comprising a microprocessor, a frequency inverter, and a sensor unit; the sensor unit inputting a phase current or phase currents, a phase voltage, and a DC bus voltage into the microprocessor, and the microprocessor outputting a signal to control the frequency inverter, the frequency inverter being connected to the winding of the stator assembly. A unique rotor design in structural dimensions is critical to produce the sinusoidal waveform of airgap flux density. Specifically, it is requires a ratio between an air gap of the motor and a thickness of the magnets ranging from 0.03 to 0.065, and a ratio between a length of a pole arc and a length of the magnets ranging from 0.8 to 1.0. An output torque $T_{torque}$ of the salient pole permanent magnet motor is dependent on a sum of the main field torque $K_fI_q$ and the torque $(L_d-L_q)\cdot I_dI_q$; and an algorithm control program of the microprocessor takes advantage of contributions of a reluctance torque $(L_d-L_q)\cdot I_dI_q$ to improve the output torque $T_{torque}$.

In a class of this embodiment, under a flux weakening control, the microprocessor employs a torque to increase the output torque $T_{torque}$, an operating position of the permanent magnet motor is initiated from W1 to W2, correspondingly, the output torque $T_{torque}$ is increased from T1 to T2, and a rotational speed S is increased from S1 to S2.

A second technical scheme of a method for controlling a blower system is summarized:

A method for controlling a blower system, the system comprising a permanent magnet motor and a wind wheel driven by the permanent magnet motor; the permanent magnet motor comprising a stator assembly comprising a winding, a rotor assembly, and a motor controller; the rotor assembly being a salient pole rotor comprising a rotor core and magnets embedded in the rotor core; the motor controller employing a sensorless vector control mode, the motor controller comprising a microprocessor, a frequency inverter, and a sensor unit; the sensor unit inputting a phase current or phase currents, a phase voltage, and a DC bus voltage into the microprocessor, and the microprocessor outputting a signal to control the frequency inverter, the frequency inverter being connected to the winding of the stator assembly; a ratio between an air gap of the motor and a thickness of the magnets ranging from 0.03 to 0.065, and a ratio between a length of a pole arc and a length of the magnets ranging from 0.8 to 1.0. The method comprises: providing the microprocessor with a torque current control module and a direct stator flux vector control (SFVC) module, detecting operating parameters and operating conditions of the motor by the microprocessor, calculating and determining whether the frequency inverter is in a saturated state; controlling the operation of the motor by the torque current control module if the frequency inverter is not saturated; or controlling the operation of the motor by the direct SFVC module if the frequency inverter is saturated.

In a class of this embodiment, the torque current control module works in an operating mode of a maximum torque per ampere (MTPA).

In a class of this embodiment, the direct SFVC module works in an operating mode of a maximum torque per volt (MTPV).

In a class of this embodiment, the microprocessor further comprises a stator flux observer by which a flux, a flux angle, and a load angle are calculated and input into the direct SFVC module.

A third technical scheme of a method for controlling a blower system is summarized:

A method for controlling a blower system, the system comprising a permanent magnet motor and a wind wheel driven by the permanent magnet motor; the permanent magnet motor comprising a stator assembly comprising a winding, a rotor assembly, and a motor controller; the rotor assembly being a salient pole rotor comprising a rotor core and magnets embedded in the rotor core; the motor controller employing a sensorless vector control mode, the motor controller comprising a microprocessor, a frequency inverter, and a sensor unit; the sensor unit inputting a phase current or phase currents, a phase voltage, and a DC bus voltage into the microprocessor, and the microprocessor outputting a signal to control the frequency inverter, the frequency inverter being connected to the winding of the stator assembly; a ratio between an air gap of the motor and a thickness of the magnets ranging from 0.03 to 0.065, and a ratio between a length of a pole arc and a length of the magnets ranging from 0.8 to 1.0; a number of magnetic poles of the rotor is 8, 10, or 12; and the method comprises steps as follows:

1) determining a critical speed S1 at the moment that the frequency inverter is saturated, and inputting the critical speed S1 to the microprocessor;
2) providing the microprocessor with a torque current control module and a direct SFVC module, detecting whether an actual speed S is higher than the critical speed S1 by the microprocessor;
3) controlling the operation of the motor by the torque current control module if the actual speed S is no higher than the critical speed S1; or
4) controlling the operation of the motor by the direct SFVC module if the actual speed S is higher than the critical speed S1.

A fourth technical scheme of a method for controlling a blower system is summarized:

A method for controlling a blower system, the system comprising a permanent magnet motor and a wind wheel driven by the permanent magnet motor; the permanent magnet motor comprising a stator assembly comprising a winding, a rotor assembly, and a motor controller; the rotor assembly being a salient pole rotor comprising a rotor core and magnets embedded in the rotor core; the motor controller employing a sensorless vector control mode, the motor controller comprising a microprocessor, a frequency inverter, and a sensor unit; the sensor unit inputting a phase current or phase currents, a phase voltage, and a DC bus voltage into the microprocessor, and the microprocessor outputting a signal to control the frequency inverter, the frequency inverter being connected to the winding of the stator assembly; a ratio between an air gap of the motor and a thickness of the magnets ranging from 0.03 to 0.065, and a ratio between a length of a pole arc and a length of the magnets ranging from 0.8 to 1.0; a number of magnetic poles of the rotor is 8, 10, or 12; and the method comprising steps as follows:

1) determining a critical torque T1 at the moment that the frequency inverter is saturated, and inputting the critical torque T1 to the microprocessor;
2) providing the microprocessor with a torque current control module and a direct SFVC module, detecting whether an required torque T is larger than the critical torque T1 by the microprocessor;
3) controlling the operation of the motor by the torque current control module if the required torque T is no larger than the critical torque T1; or
4) controlling the operation of the motor by the direct SFVC module if the required torque T is larger than the critical torque T1.

A fifth technical scheme of a method for controlling a blower system is summarized:

A method for controlling a blower system, the system comprising a permanent magnet motor and a wind wheel driven by the permanent magnet motor; the permanent magnet motor comprising a stator assembly comprising a winding, a rotor assembly, and a motor controller; the rotor assembly being a salient pole rotor comprising a rotor core and magnets embedded in the rotor core; the motor controller employing a sensorless vector control mode, the motor controller comprising a microprocessor, a frequency inverter, and a sensor unit; the sensor unit inputting a phase current or phase currents, a phase voltage, and a DC bus voltage into the microprocessor, and the microprocessor outputting a signal to control the frequency inverter, the frequency inverter being connected to the winding of the stator assembly; a ratio between an air gap of the motor and a thickness of the magnets ranging from 0.03 to 0.065, and a ratio between a length of a pole arc and a length of the magnets ranging from 0.8 to 1.0; a number of magnetic poles of the rotor is 8, 10, or 12; the microprocessor comprising a torque current control module, a direct SFVC module, and a stator flux observer; and the method comprising steps as follows:

1) reading a required torque;
[2) determining a d-axis inductance Ld, and a q-axis inductance Lq in a state of magnetic saturation;]
3) outputting a stator flux, a flux angle, and a load angle by the stator flux observer;
4) calculating a reference flux based on an operating mode of a maximum torque per ampere (MTPA);
5) calculating a limited flux based on an operating mode of a maximum torque per volt (MTPV);
6) determining whether the limited flux is larger than the reference flux;
7) calculating the voltage Vq according to the requirement of the torque, and calculating the voltage $V_d$ in the operating mode of MTPA, if the limited flux is larger than the reference flux, and the frequency inverter is not saturated; or calculating the voltage $V_q$ according to the requirement of the torque, and calculating the voltage $V_d$ in the operating mode of MTPV, if the limited flux is no larger than the reference flux;
8) converting voltages $V_d$ and $V_q$ into voltages $V_\alpha$ and $V_\beta$ in a stationary coordinate, converting the voltages $V_\alpha$ and $V_\beta$ in the stationary coordinate into three-phase voltages $V_a$, $V_b$, and $V_c$, and processing a PWM modulation using the three-phase voltages $V_a$, $V_b$, and $V_c$.

Advantages of the method for controlling a blower system are summarized below:

1) The microprocessor of the motor detects operating parameters and operating conditions of the motor, calculates and determines whether the frequency inverter is in a saturated state; the operation of the motor is controlled by the torque current control module if the frequency inverter is not saturated, or controlled by the direct SFVC module if the frequency inverter is saturated; thus, the optimized controlling strategies are realized, the method improves the torque and the rotational speed, in another word, the method lowers the manufacturing costs and saves the energy consumption.
2) the torque current control module works in an operating mode of a maximum torque per ampere MTPA, and the direct SFVC module works in an operating mode of a maximum torque per volt MTPV; thus, the method further lowers the energy consumption, and optimizes the control.

BRIEF DESCRIPTION OF THE DRAWINGS

The invention is described herein below with reference to the accompanying drawings, in which.

DETAILED DESCRIPTION OF THE EMBODIMENTS

Detailed description of the invention will be given below in conjunction with accompanying drawings.

EXAMPLE 1

Figure 1:
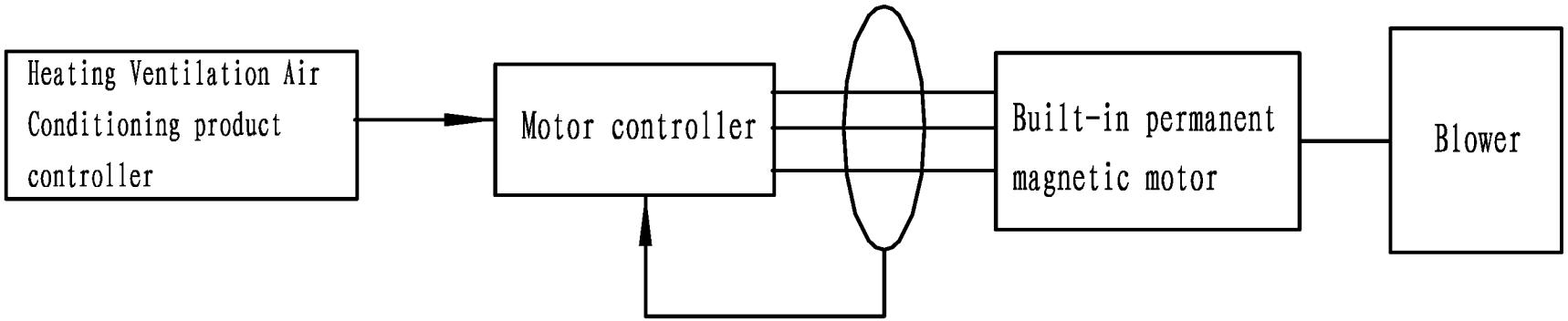
FIG. 1 (Prior art)
FIG. 1 is a block diagram of a blower system.
Figure 2:
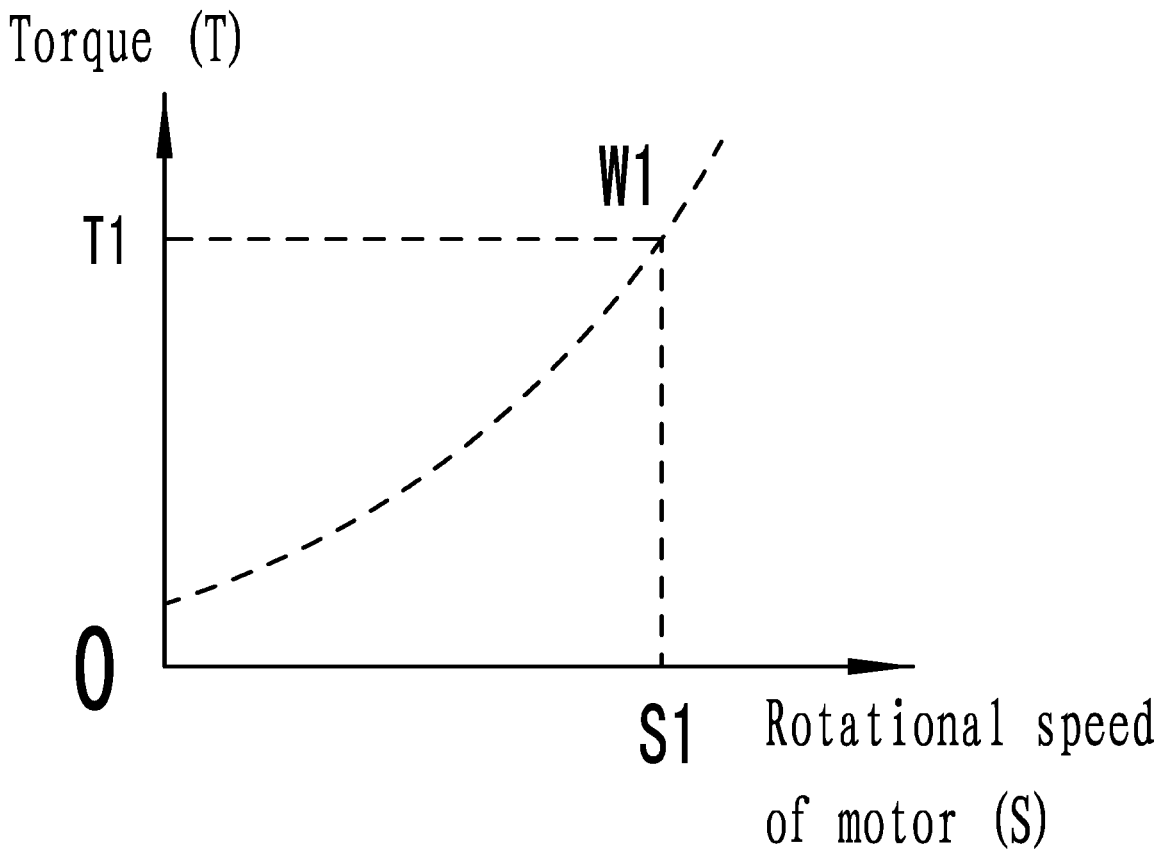
FIG. 2 (Prior art)
FIG. 2 is a torque-rotational speed curve of a convention blower system.
Figure 3:
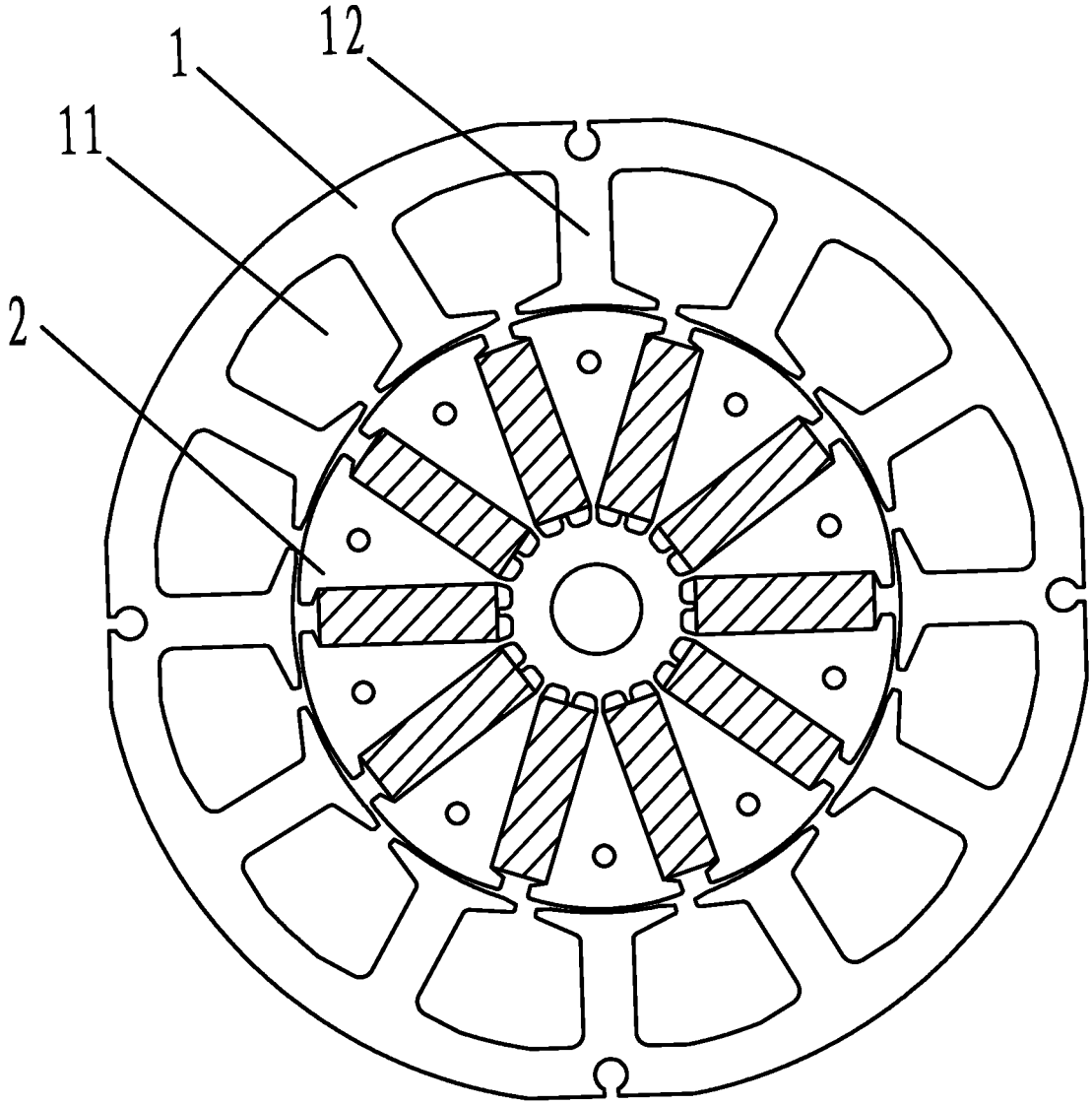
FIG. 3 is a schematic diagram of a magnet motor of a blower system in accordance with one embodiment of the invention.
Figure 4:
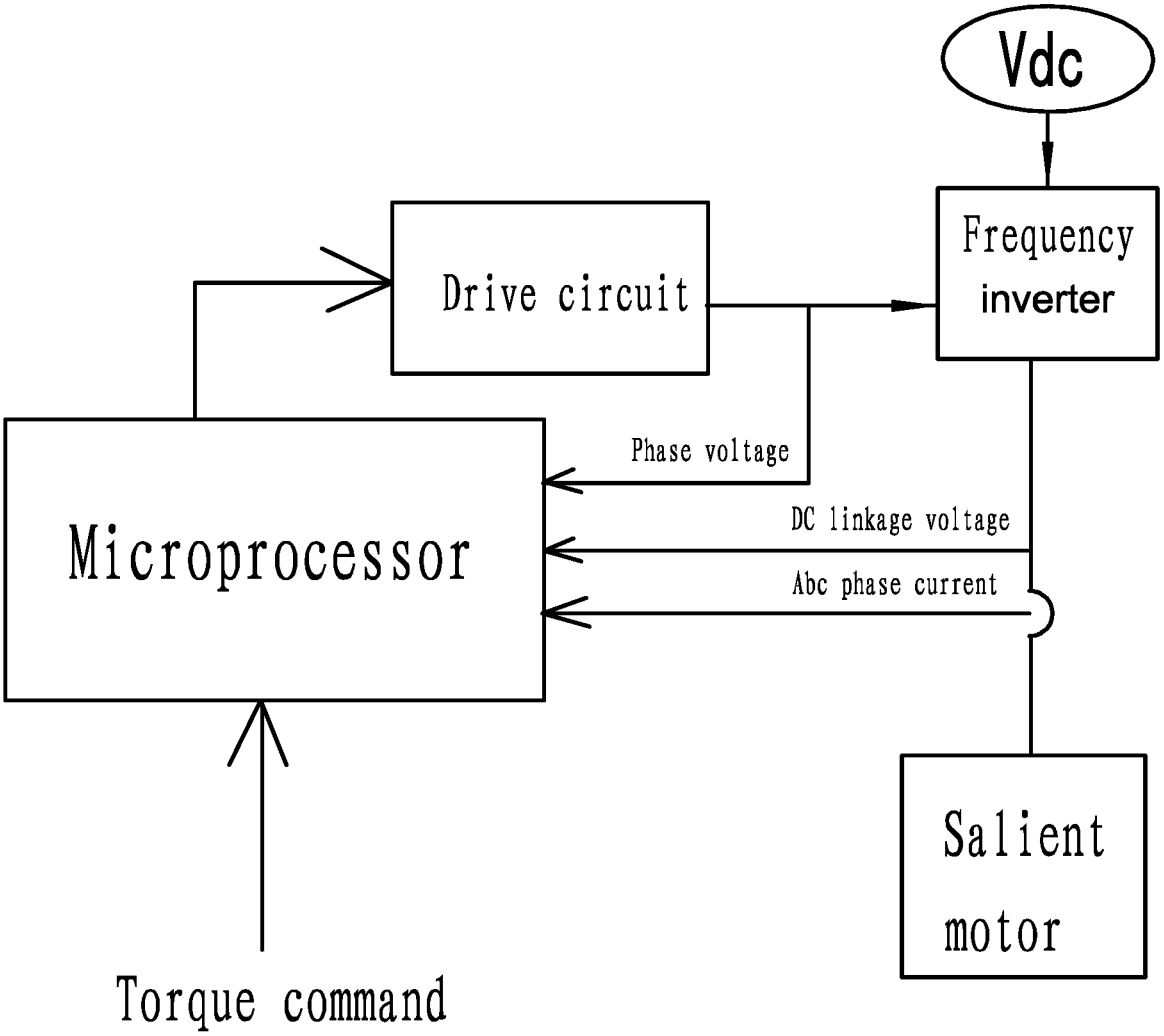
FIG. 4 is a block diagram of a motor controller of a magnet motor of a blower system in accordance with one embodiment of the invention.
Figure 5:
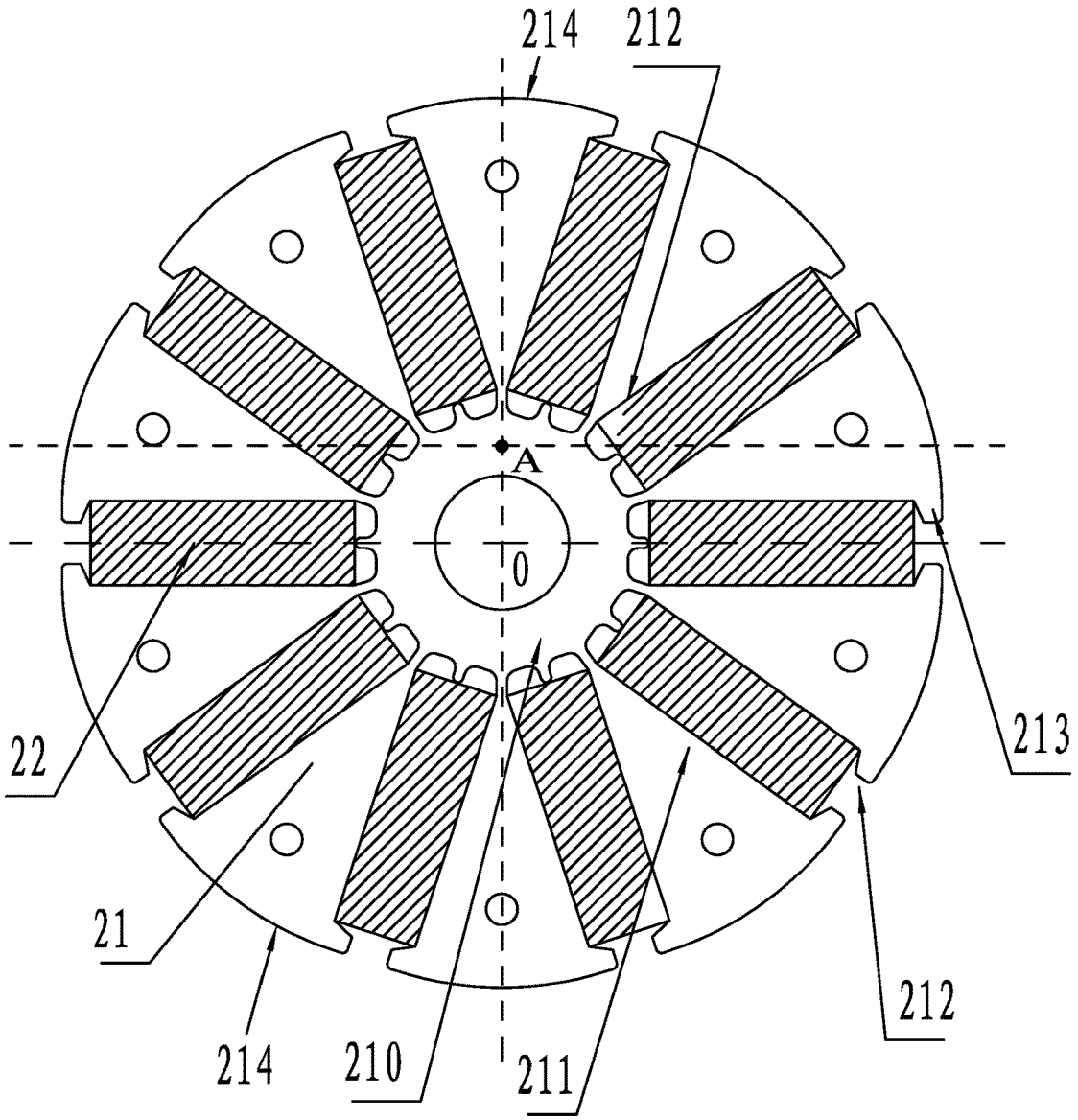
FIG. 5 is a schematic diagram of a salient pole rotor of a permanent magnet motor of a blower system in accordance with one embodiment of the invention.

A blower system comprises a permanent magnet motor and a wind wheel driven by the permanent magnet motor. The permanent magnet motor, as shown in FIGS. 3-5, comprises a stator assembly, a rotor assembly 2, and a motor controller. The rotor assembly comprises a rotor core 1 and a coil winding; the rotor core 1 comprises teeth 12 and slots 11, and the coil winding is winded on the teeth 12. The rotor assembly comprises a salient pole rotor. The motor controller employs a sensorless vector control mode and comprises a microprocessor, a frequency inverter, and a sensor unit. The sensor unit inputs a phase current or phase currents, a phase voltage, and a DC bus voltage into the microprocessor, and the microprocessor outputs a signal to control the frequency inverter which is connected to the winding of the stator assembly. A saliency $L_q/L_d$ of the salient pole rotor is 1.3-1.7, an air gap flux density on a surface of the salient pole rotor is 0.6-0.8 tesla, the microprocessor outputs signals to control the frequency inverter through a drive circuit, and the frequency inverter is connected to the winding of the stator assembly.

Figure 17:
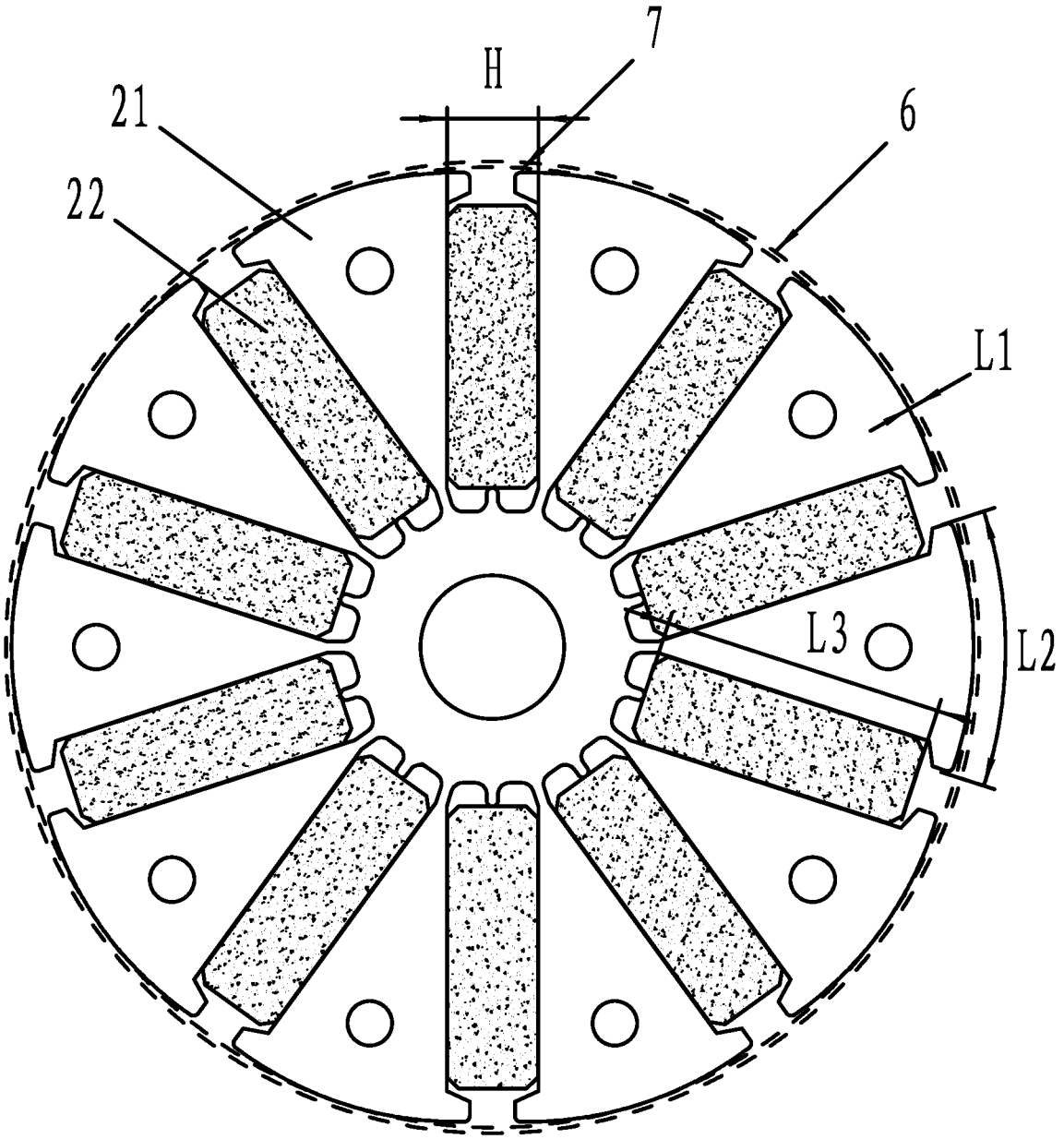
FIG. 17 is a size diagram of a salient pole rotor of a permanent magnet motor in accordance with one embodiment of the invention.

The salient pole rotor 2 comprises a rotor core 21 and a permanent magnet 22. The rotor core 21 comprises an annular ring 210 comprising a central axial bore, and a plurality of magnetic induction blocks 211 protruding outwards from an outer side of the annular ring 210; between two adjacent magnetic induction blocks 211 is formed a radial recess 212 for receiving the permanent magnet 22; and a hook block 213 protrudes from the magnetic induction blocks 211 at both sides of an opening of the radial recess 212. A section of an outer side surface 214 of the magnetic induction blocks 211 is a circular-arc line; and the outer side surface 214 employs a point A with a distance H deviating from a center O of the central axial bore as a center of circle. As shown in FIG. 17, an outer dashed line 6 represents an inner wall of the stator, an inner dashed line 7 represents an outer edge of the stator core 21, between the outer dashed line 7 and the inner dashed line 6 a gap is formed in a radial direction, which is called an air gap L1. The permanent magnet 22 is also called magnets, the thickness of which is labeled as H. A ratio between the air gap L1 and a thickness of the magnets H ranges from 0.03 to 0.065, which controls the saliency Lq/Ld of the salient pole rotor between 1.3 and 1.7. A ratio between a length of a pole arc L2 of the stator core 21 and a length of the magnets ranges L3 from 0.8 to 1.0. Based on the magnetic flux gathering effect generated by two permanent magnets having the same poles, the surface air gap flux density of the salient pole rotor ranges from 0.6 to 0.8 Tesla. By improving the torque density and improving the flux density via the salient pole structure, or by substituting the ferrite with the original Nd—Fe—B as the magnets, the production cost can be decreased. The number of magnetic poles of the rotor is 8, 10, or 12.

For a salient pole permanent magnet motor, the production cost can be decreased by improving the torque density, or controlling the saliency of the motor; or the torque can be decreased by employing a special control strategy.

The output torque of the salient pole permanent magnet motor is dependent on a sum of the main field torque $K_fI_q$ and the torque $(L_d-L_q)\cdot I_dI_q$, as shown in the following formula, it is known that the torque comprises two parts, one part is produced by the permanent magnetic field and the current $I_g$, the other part is produced by the reluctance torque, which is dependent on the salient pole inductance, and two current $I_q$ and $I_d$.

$$T_{torque}=>K_fI_q+(L_d-L_q)\cdot I_dI_q$$

Figure 6:
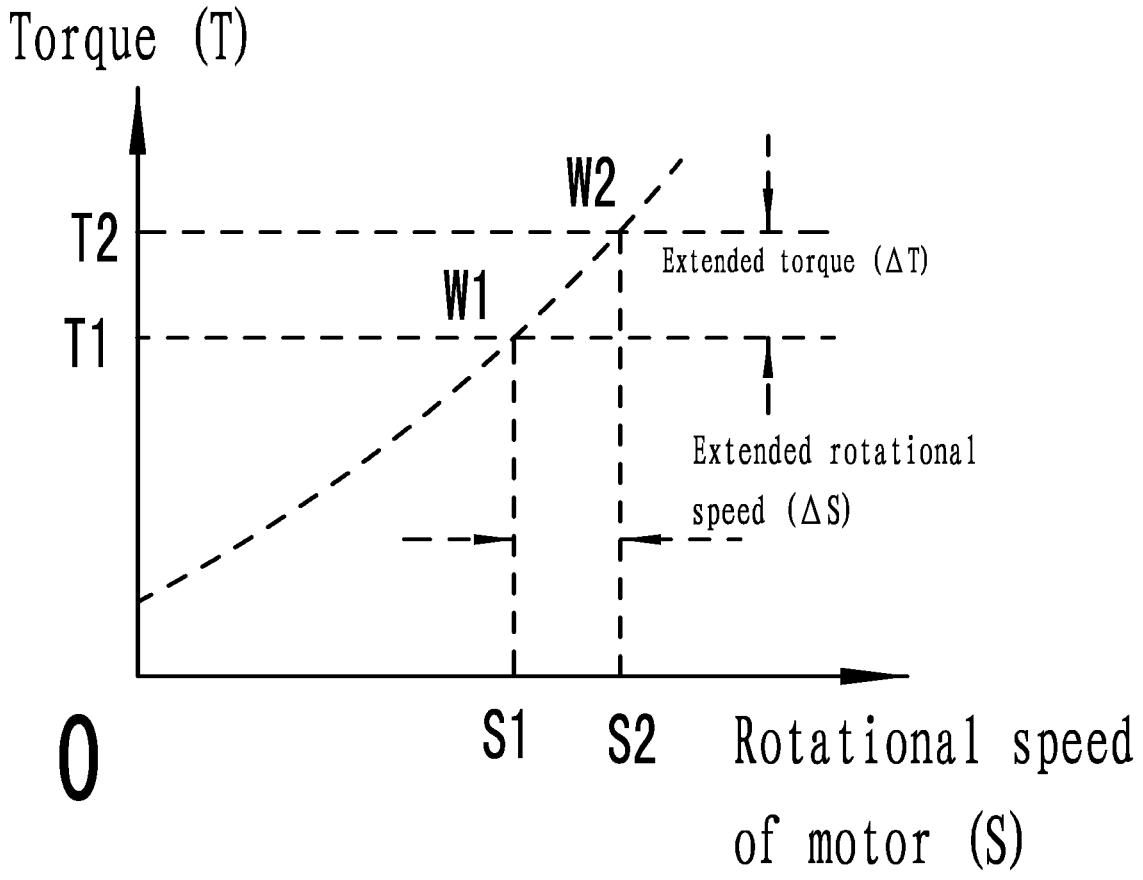
FIG. 6 is a torque-rotational speed curve of a blower system in accordance with one embodiment of the invention.

A torque-rotational speed characteristic curve of an inner permanent magnet motor of a motor system of the invention is shown in FIG. 6. The conventional strategy is that, the motor runs at a base rotational speed S1 at the operating position W1, the frequency inverter is saturated at the base rotational speed S1, thus, it cannot provide with anymore current to produce a larger torque. Compared with the conventional strategy, the example provides an inner permanent magnet motor having a salient pole rotor; the output torque is increased due to the contributions of the reluctance torque. Under a flux weakening control, the microprocessor employs a torque to increase the output torque $T_{torque}$, the operating position of the permanent magnet motor is initiated from W1 to W2. Correspondingly, the output torque $T_{torque}$ is increased from T1 to T2, and the rotational speed S is increased from S1 to S2.

The blower system employing the salient pole permanent magnet motor, not only improves the torque density, but also decreases the production cost by controlling the saliency of the motor. Furthermore, by the control strategy, the output torque is increased due to the contribution of the reluctance torque. Under the flux weakening control, the lifting torque is employed to increase the torque and the rotational speed, the operating position of the permanent magnet motor is initiated from W1 to W2. Correspondingly, the output torque T is increased from T1 to T2, and the rotational speed S is increased from S1 to S2. Thus, the motor performance is improved, in another word, the blower system has low production cost and is energy-saving.

EXAMPLE 2

Figure 7:
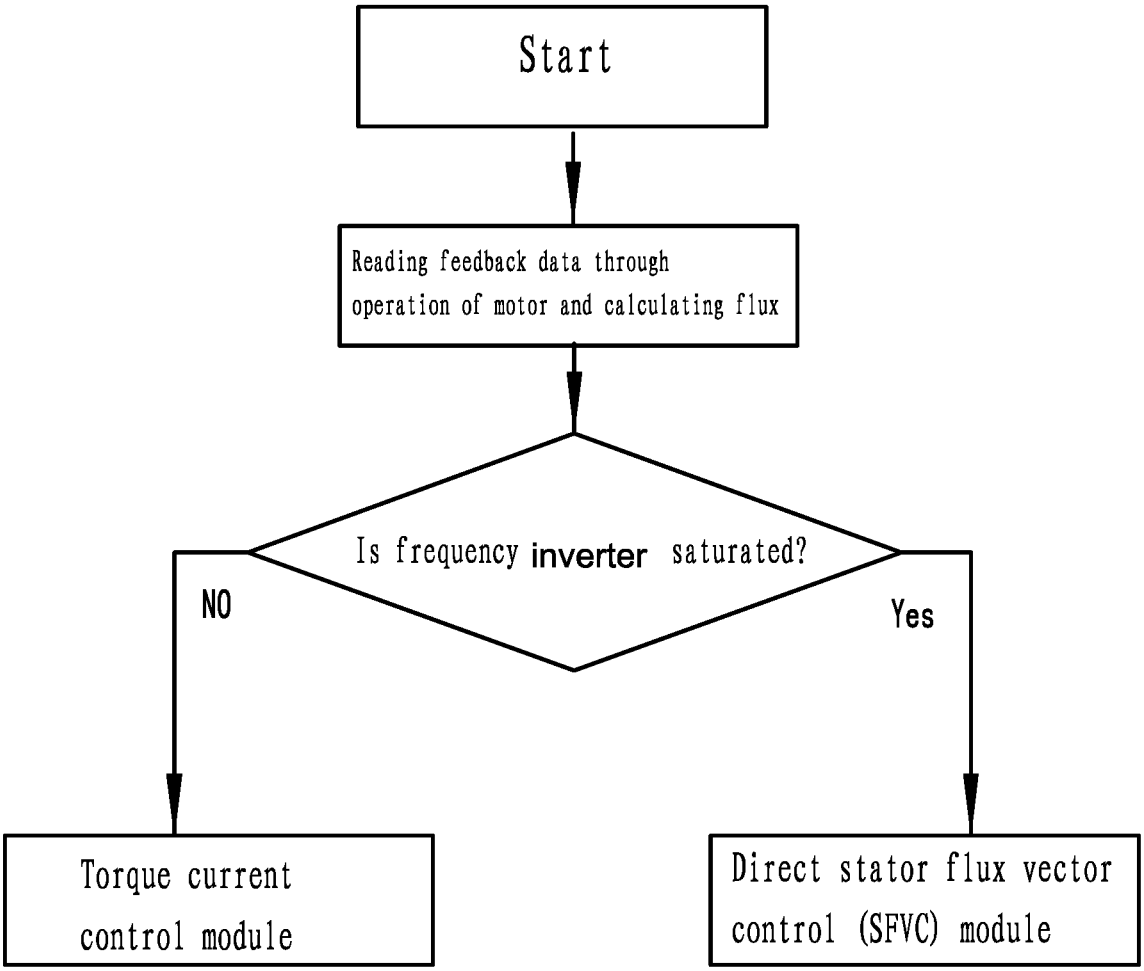
FIG. 7 is a control flow chart of a microprocessor of a motor controller of a blower system in accordance with one embodiment of the invention.

A method for controlling a blower system is shown in FIGS. 4 and 7. The system comprises a permanent magnet motor and a wind wheel driven by the permanent magnet motor. The permanent magnet motor comprises a stator assembly, a rotor assembly, and a motor controller. The rotor assembly comprises a salient pole rotor comprising a rotor core and magnets embedded in the rotor core. The motor controller employs a sensorless vector control mode and comprises a microprocessor, a frequency inverter, and a sensor unit, of them, the sensor unit inputs a phase current or phase currents, a phase voltage, and a DC bus voltage into the microprocessor, and the microprocessor outputs a signal to control the frequency inverter; the frequency inverter is connected to a winding of the stator assembly. A ratio between an air gap of the motor and a thickness of the magnets ranging from 0.03 to 0.065, and a ratio between a length of a pole arc and a length of the magnets ranging from 0.8 to 1.0. The number of magnetic poles of the rotor is 8, 10, or 12. The method comprises:

providing the microprocessor with a torque current control module and a direct SFVC module, detecting operating parameters and operating conditions of the motor by the microprocessor, calculating and determining whether the frequency inverter is in a saturated state;

controlling the operation of the motor by the torque current control module if the frequency inverter is not saturated; or controlling the operation of the motor by the direct SFVC module if the frequency inverter is saturated.

The torque current control module works in an operating mode of a maximum torque per ampere MTPA.

The direct SFVC module works in an operating mode of a maximum torque per volt MTPV.

The microprocessor further comprises a stator flux observer by which a flux, a flux angle, and a load angle are calculated and input into the direct SFVC module.

EXAMPLE 3

A method for controlling a blower system is shown in FIGS. 6 and 7. The system comprises a permanent magnet motor and a wind wheel driven by the permanent magnet motor. The permanent magnet motor comprises a stator assembly, a rotor assembly, and a motor controller. The rotor assembly comprises a salient pole rotor comprising a rotor core and magnets embedded in the rotor core. The motor controller employs a sensorless vector control mode and comprises a microprocessor, a frequency inverter, and a sensor unit, of them, the sensor unit inputs a phase current or phase currents, a phase voltage, and a DC bus voltage into the microprocessor, and the microprocessor outputs a signal to control the frequency inverter; the frequency inverter is connected to a winding of the stator assembly. A ratio between an air gap of the motor and a thickness of the magnets ranging from 0.03 to 0.065, and a ratio between a length of a pole arc and a length of the magnets ranging from 0.8 to 1.0. The number of magnetic poles of the rotor is 8, 10, or 12. The method comprises:

1) determining a critical speed S1 at the moment that the frequency inverter is saturated, and inputting the critical speed S1 to the microprocessor;

2) providing the microprocessor with a torque current control module and a direct SFVC module, detecting whether an actual speed S is higher than the critical speed S1 by the microprocessor;

3) controlling the operation of the motor by the torque current control module if the actual speed S is no higher than the critical speed S1; or 4) controlling the operation of the motor by the direct SFVC module if the actual speed S is higher than the critical speed S1.

EXAMPLE 4

A method for controlling a blower system is shown in FIGS. 6 and 7. The system comprises a permanent magnet motor and a wind wheel driven by the permanent magnet motor. The permanent magnet motor comprises a stator assembly, a rotor assembly, and a motor controller. The rotor assembly comprises a salient pole rotor comprising a rotor core and magnets embedded in the rotor core. The motor controller employs a sensorless vector control mode and comprises a microprocessor, a frequency inverter, and a sensor unit, of them, the sensor unit inputs a phase current or phase currents, a phase voltage, and a DC bus voltage into the microprocessor, and the microprocessor outputs a signal to control the frequency inverter; the frequency inverter is connected to a winding of the stator assembly. A ratio between an air gap of the motor and a thickness of the magnets ranging from 0.03 to 0.065, and a ratio between a length of a pole arc and a length of the magnets ranging from 0.8 to 1.0. The number of magnetic poles of the rotor is 8, 10, or 12. The method comprises:

1) determining a critical torque T1 at the moment that the frequency inverter is saturated, and inputting the critical torque T1 to the microprocessor;

2) providing the microprocessor with a torque current control module and a direct SFVC module, detecting whether an required torque T is larger than the critical torque T1 by the microprocessor;

3) controlling the operation of the motor by the torque current control module if the required torque T is no larger than the critical torque T1; or 4) controlling the operation of the motor by the direct SFVC module if the required torque T is larger than the critical torque T1.

EXAMPLE 5

Figure 8A:
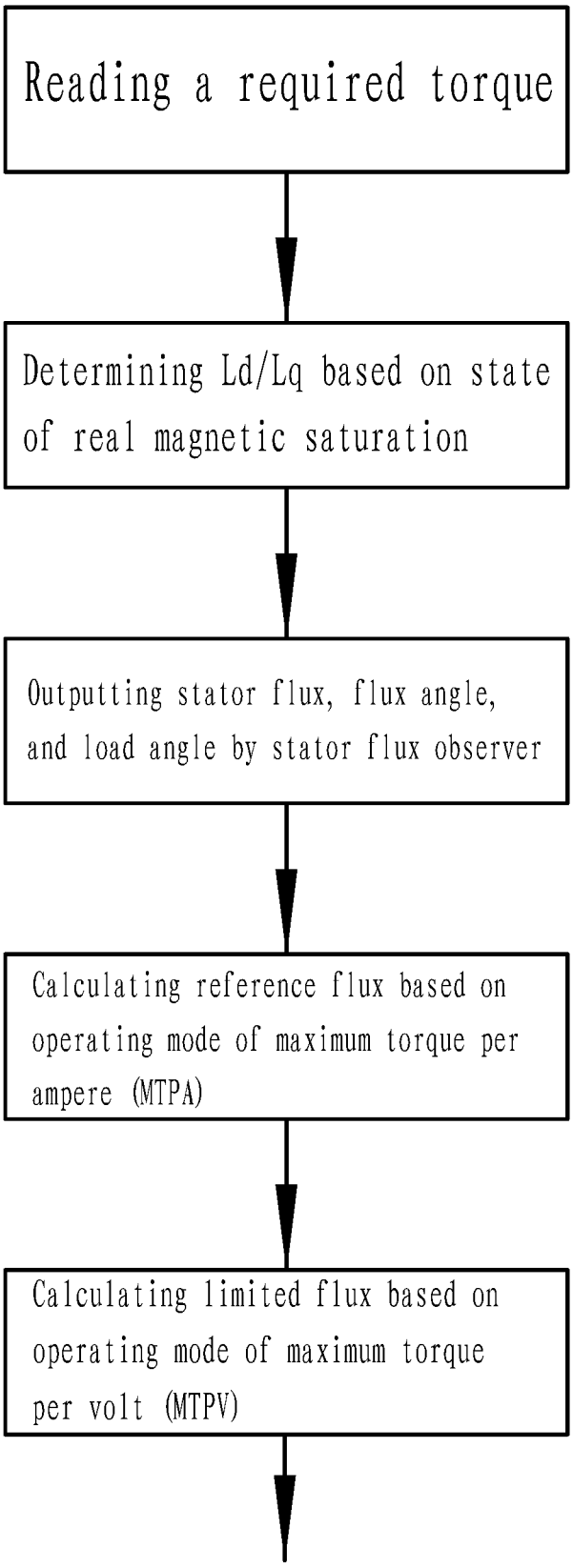
FIG. 8a is a first part of a control flow chart of a blower system in accordance with one embodiment of the invention.
Figure 8B:
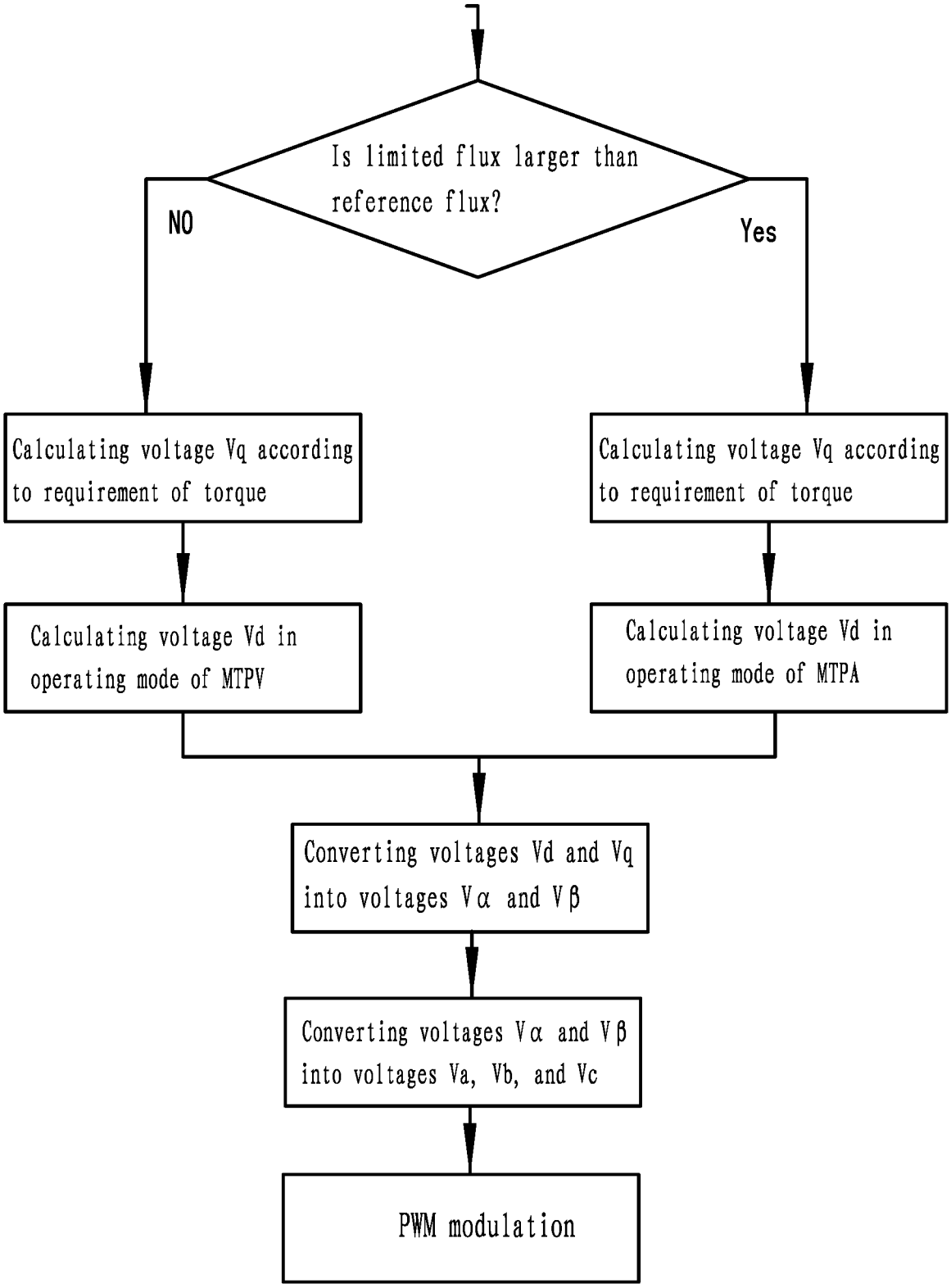
FIG. 8b is a second part of a control flow chart of a blower system in accordance with one embodiment of the invention.

A method for controlling a blower system is shown in FIGS. 8a and 8b. The system comprises a permanent magnet motor and a wind wheel driven by the permanent magnet motor. The permanent magnet motor comprises a stator assembly, a rotor assembly, and a motor controller. The rotor assembly comprises a salient pole rotor comprising a rotor core and magnets embedded in the rotor core. The motor controller employs a sensorless vector control mode and comprises a microprocessor, a frequency inverter, and a sensor unit, of them, the sensor unit inputs a phase current or phase currents, a phase voltage, and a DC bus voltage into the microprocessor, and the microprocessor outputs a signal to control the frequency inverter; the frequency inverter is connected to a winding of the stator assembly. A ratio between an air gap of the motor and a thickness of the magnets ranging from 0.03 to 0.065, and a ratio between a length of a pole arc and a length of the magnets ranging from 0.8 to 1.0. The number of magnetic poles of the rotor is 8, 10, or 12. The microprocessor comprising a torque current control module, a direct SFVC module, and a stator flux observer. The method comprises:

1) reading a required torque;

[2) determining an inductance Ld, and an inductance Lq in a state of magnetic saturation;]

3) outputting a stator flux, a flux angle, and a load angle by the stator flux observer;

4) calculating a reference flux based on an operating mode of a maximum torque per ampere (MTPA);

5) calculating a limited flux based on an operating mode of a maximum torque per volt (MTPV);

6) determining whether the limited flux is larger than the reference flux;

7) calculating the voltage $V_q$ according to the requirement of the torque, and calculating the voltage $V_d$ in the operating mode of MTPA, if the limited flux is larger than the reference flux, and the frequency inverter is not saturated; or calculating the voltage $V_q$ according to the requirement of the torque, and calculating the voltage $V_d$ in the operating mode of MTPV, if the limited flux is no larger than the reference flux; and 8) converting voltages $V_d$ and $V_q$ into voltages $V_\alpha$ and $V_\beta$ in a stationary coordinate, converting the voltages $V_\alpha$ and $V_\beta$ in the stationary coordinate into three-phase voltages $V_a$, $V_b$, and $V_c$, and processing a PWM modulation using the three-phase voltages $V_a$, $V_b$, and $V_c$. The torque current control module, the direct SFVC module, the operating mode of the MTPA, and the operating mode of the MTPV are described herein below:

1) The torque current control module is a commonly used module to control the permanent magnet motor in the motor system. Under a command of the required rotational speed and torque from the outside, the required torque is achieved; the torque is converted into the actual operating current of the motor, and the motor works at the actual operating current under the closed-looped control. The control mode is very efficient when the frequency inverter is not saturated.

2) In the vector control for a permanent magnet synchronous motor (PMSM), an optimal control is to acquire a maximum output torque at a lowest current; an operating mode of MTPA, compared with other operating modes, acquires the same torque at a lowest current, such an operating mode is very efficient when the frequency inverter is not saturated. However, when the frequency inverter is saturated, the operating mode of MTPA is not applicable. The operating mode of MTPA is described in many textbooks, patent literatures, and papers.

Figure 9:
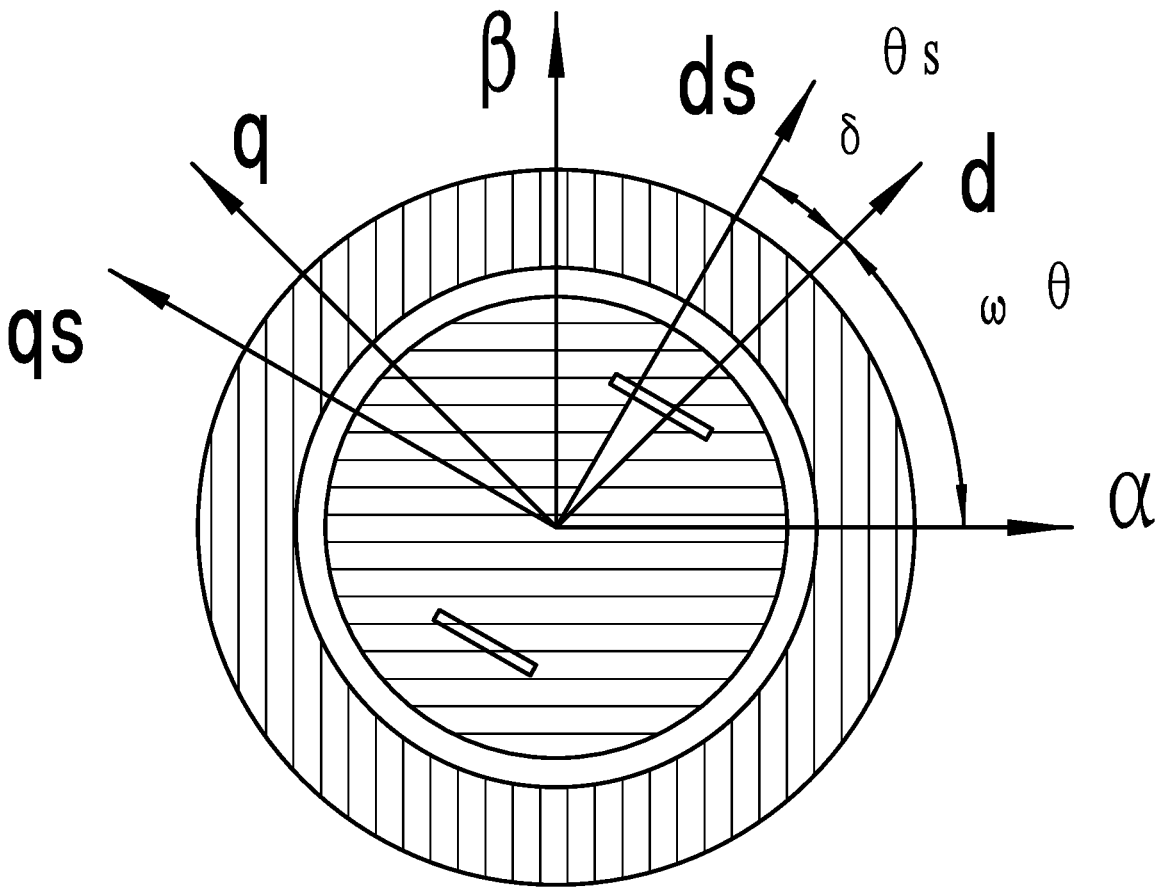
FIG. 9 is a coordinate system of a direct SFVC.

The direct SFVC module is as shown in FIG. 9, in which, vector reference coordinates of the PMSM are defined: stationary coordinatesa, β; rotor coordinates d, q; and stator coordinates $d_s$, $q_s$.

In the stationary coordinates α, β, the relation between the voltage and the torque of the inner PMSM is as follows:

$$\bar{v}_{\alpha\beta} = R_s \cdot \bar{i}_{\alpha\beta} + \frac{d\bar{\lambda}_{\alpha\beta}}{dt} \tag{1}$$

$$T_e = \frac{3}{2} \cdot p \cdot (\lambda_\alpha \cdot i_\beta - \lambda_\beta \cdot i_\alpha) \tag{2}$$

$R_s$ represents a stator resistor, and p represents a number of pole pairs.

The control mode of the motor is achieved by coupling current through the magnetic flux, and the control is converted into an electromagnetic flux control. For an inner PMSM, the formula of the rotor coordinates d, q is as follows:

$$\bar{\lambda}_{dq} = [L] \cdot \begin{bmatrix} i_d \\ i_q \end{bmatrix} + \begin{bmatrix} \lambda_m \\ 0 \end{bmatrix} = \begin{bmatrix} \lambda_d(i_d, i_q) \\ \lambda_q(i_d, i_q) \end{bmatrix} \tag{3}$$

$\lambda_m$ represents magnetic flux linkage.

If the flux is not in a saturated state, the above formula (3) can be simplified as:

$$\bar{\lambda}_{dq} = \begin{bmatrix} L_d & 0 \\ 0 & L_q \end{bmatrix} \cdot \begin{bmatrix} i_d \\ i_q \end{bmatrix} + \begin{bmatrix} \lambda_m \\ 0 \end{bmatrix} \tag{4}$$

$L_d$ is an inductance of a d-axis of the motor, and $L_q$ is an inductance of a q-axis of the motor.

If the rotor's position is ν, and the magnet domain in the coordinates α, β, the formulaic:

$$\begin{aligned} \bar{\lambda}_{\alpha\beta} &= A(-\vartheta) \cdot \bar{\lambda}_{dq} \\ &= A(-\vartheta) \cdot \left\{ \begin{bmatrix} L_d & 0 \\ 0 & L_q \end{bmatrix} \cdot A(\vartheta) \begin{bmatrix} i_\alpha \\ i_\beta \end{bmatrix} + \begin{bmatrix} \lambda_m \\ 0 \end{bmatrix} \right\} \end{aligned} \tag{5}$$

$$A(\vartheta) = \begin{bmatrix} \cos(\vartheta) & \sin(\vartheta) \\ -\sin(\vartheta) & \cos(\vartheta) \end{bmatrix}$$

In the stator coordinates $d_s$, $q_s$, the voltage-torque relation is:

$$\bar{v}_{dqs} = R_s \cdot \bar{i}_{dqs} + \frac{d}{dt}\begin{bmatrix} \lambda \\ 0 \end{bmatrix} + \lambda \cdot \begin{bmatrix} 0 \\ \omega + \frac{d\delta}{dt} \end{bmatrix} \tag{6}$$

$$T_e = (3/2) \cdot p \cdot \lambda \cdot i_{qs} = k_T \cdot i_{qs} \tag{7}$$

ω represents the rotational speed, and δ represents the load angle.

In reference to formula (6), the stator flux vector λ, and voltage of d-axis are directly modified, whereas the load angle and the torque can be controlled by the voltage of q-axis; as shown in formula (7), the current of $q_s$ axis directly controls the torque.

Figure 10:
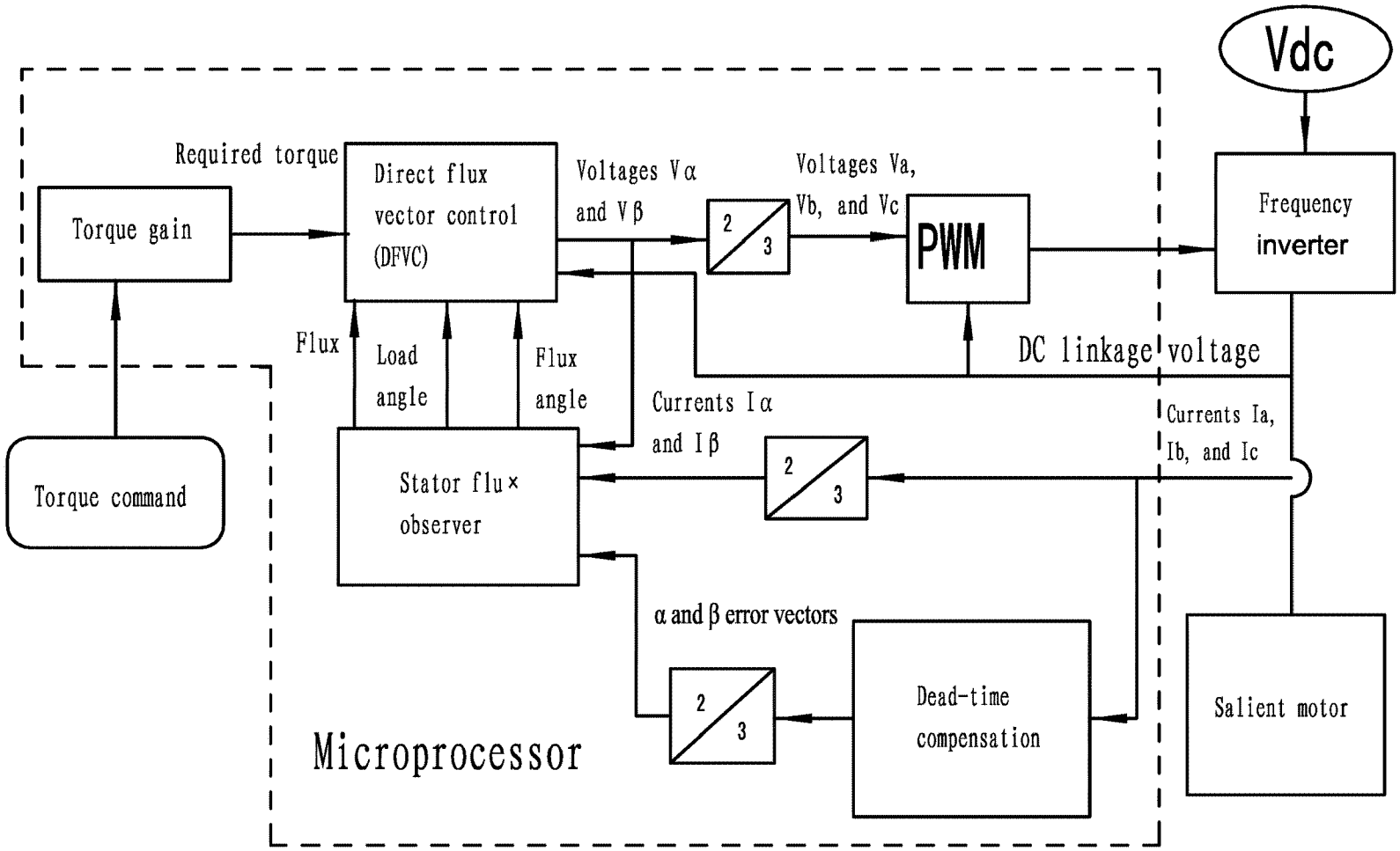
FIG. 10 is a block diagram of a direct SFVC having a direct torque input.

As shown in FIG. 10, a control combination block diagram of a torque control mode and a flux control comprises a direct flux vector control (DFVC), a stator flux observer, and a dead-time compensation module. A torque command is input via a torque gain, and the torque command is used as a required torque standard to adjust the torque.

Figure 11:
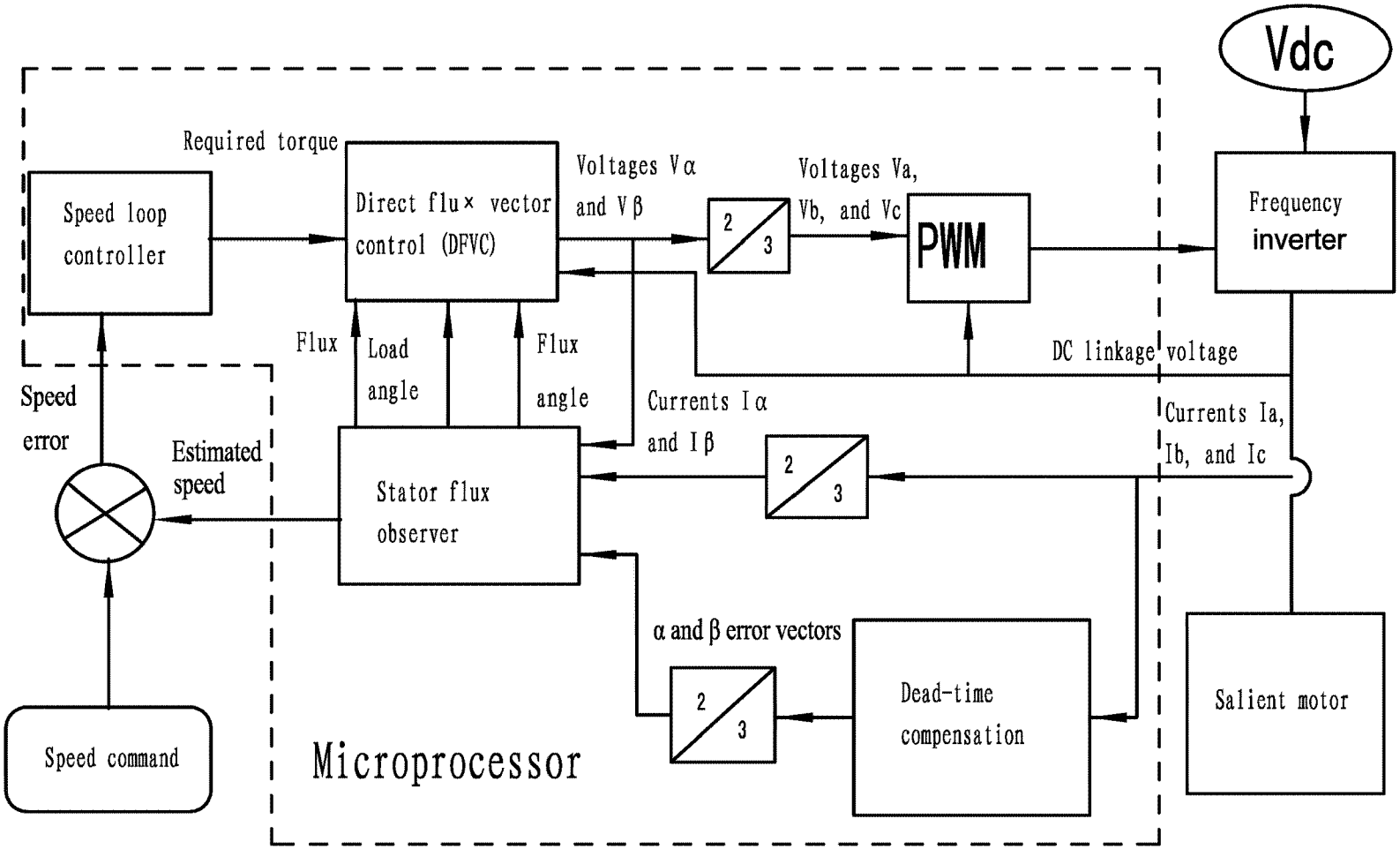
FIG. 11 is a block diagram of a direct SFVC having a speed input.

As shown in FIG. 11, a control combination block diagram of a speed control mode and a flux control comprises a DFVC, a stator flux observer, and a dead-time compensation module. A speed control command is used as a standard for a proportional integral controller, and a speed loop controller produces a torque command.

Figure 12:
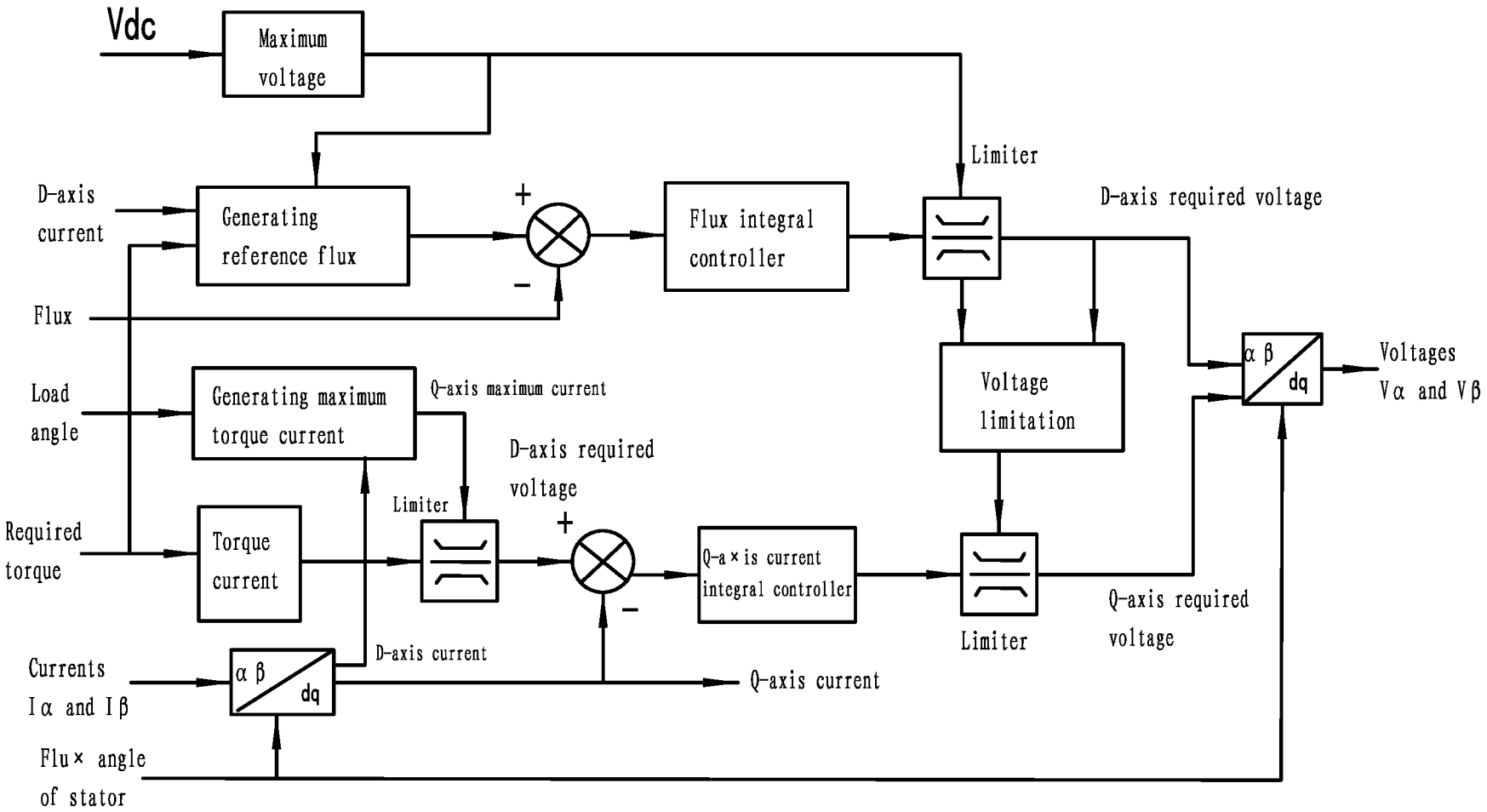
FIG. 12 is an expanded view of a direct SFVC module of FIG. 10.

A block diagram of the DFVC is shown in FIG. 12. The technical scheme is carried out in a stator flux base structure. The flux observer inputs feedback information and an output of the flux into a DFVC strategy. The torque command controls the reference variables. The DFVC comprises two control loops, that is, a stator flux loop and a q-axis current loop, and a proportional integral controller is used to control the two control loops. The DFVC strategy is advantageous in that, when adjusting the flux and current, the frequency voltage, limitations of current and load angle are taken into consideration.

Figure 13:
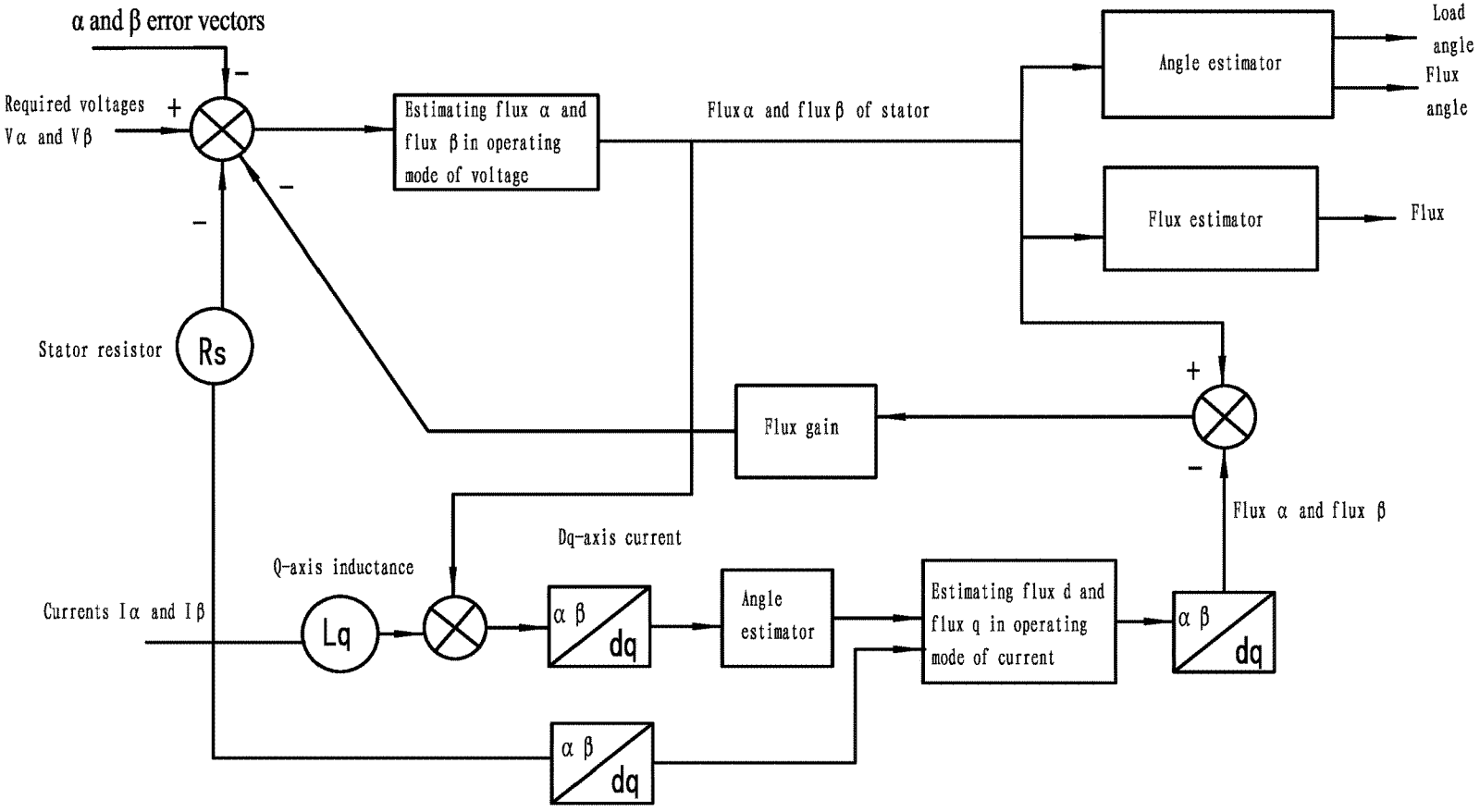
FIG. 13 is an expanded view of a stator flux observer of FIG. 10.

FIG. 13 is a block diagram of the stator flux observer, in which, the observer is a critical part to provide a stator flux value, a position of stator flux, and a load angle. The output of the stator flux observer is an input of the DFVC. The stator flux observer is a combination of two models, and chooses a corresponding control mode to operate based on whether the frequency controller is saturated or not. When the rotational speed is low, the motor runs in the current mode, the control is accomplished by controlling the current according to the input torque, that is, the torque current control module; when the rotational speed is high, the motor runs in the voltage mode which only controls the voltage, that is, the direct SFVC module. The crossing angle frequency changes between a low speed and a high speed mode, and can be defined by the gain (rad/s) of the observer.

Figure 14:
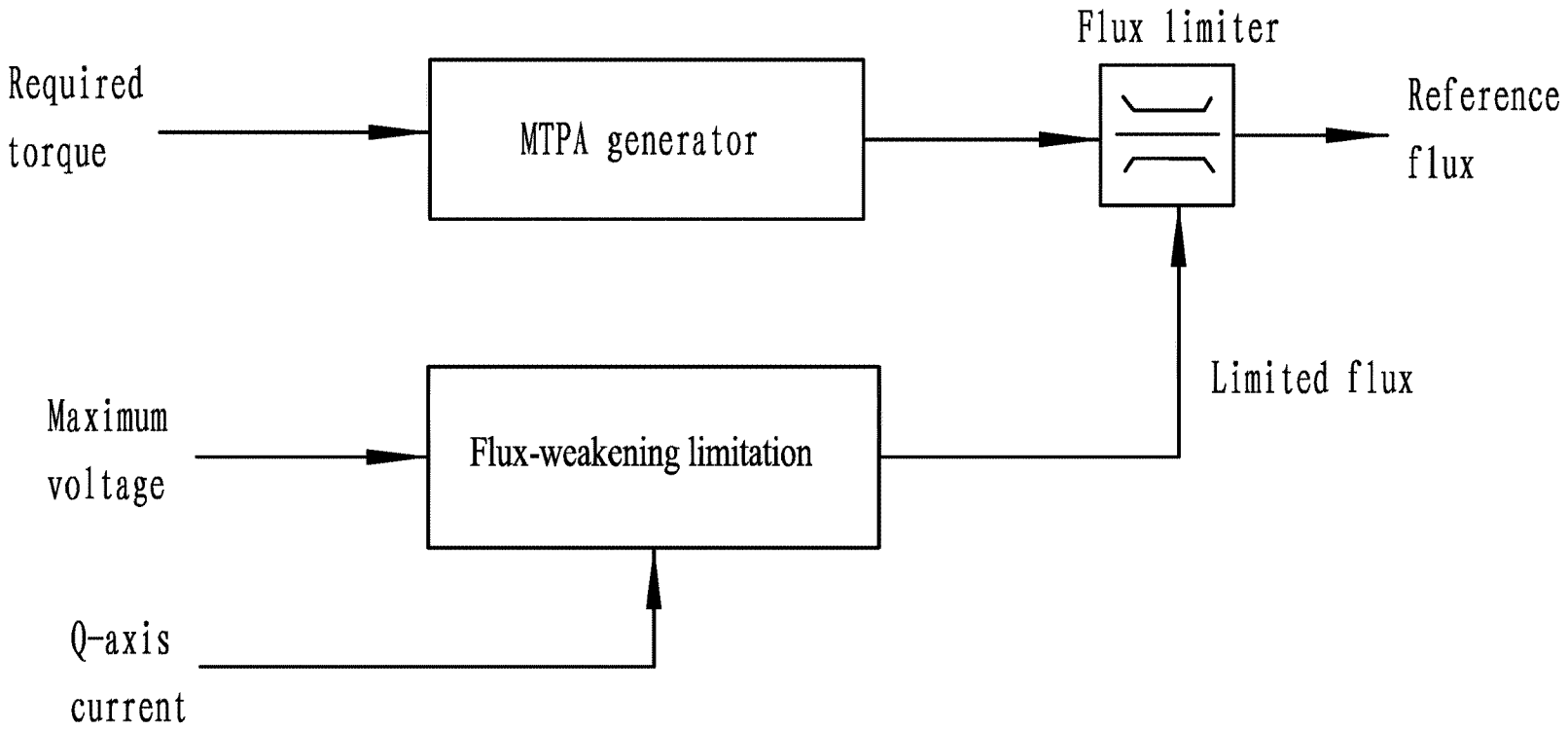
FIG. 14 is a flow chart of a direct stator flux vector controlling the production of a reference flux.

FIG. 14 is a block diagram for producing a reference flux module. Under the controls of a low speed MTPA and a flux weakening of a torque, the reference flux production module provides a reference flux based on a saturated frequency inverter or a range of speed. As shown in FIG. 6, when a basic rotational speed is W1, the reference flux is provided by an optimal operating mode, i.e., the maximum torque per ampere MTPA. The operating mode of MTPA is a nonlinear curve, and such a nonlinear curve can be acquired in a characteristic test, or simulated by a finite element analysis. Then, a look-up table method is effectively carried out. When the rotational speed is increased, the back-electromotive force of the motor is increased, and the frequency inverter begins to be saturated, which allows the voltage limitation to work, and at the same time, the conditions of MTPA do not work anymore. The highest voltage is dependent on the PWM strategy and a transient DC linkage voltage, the voltage limitation is accomplished by limiting the stator reference flux, and the reference value is provided by a weak magnet limiting module. According to the method, the switch between the flux weakening control and the MTPA control can be automatically carried out, which is based on a practical and efficient highest DC bus voltage and the required q-axis current. As shown in FIG. 10, the action of the voltage limitation is something like to output magnetic flux to the current controller.

The formula of the voltage limitation is:

$$(R_s i_{ds})^2+(R_s i_{qs}+\omega\lambda)^2 \leq V_{s,max}^2 \tag{8}$$

$V_{s,max}$ is dependent on the PWM strategy and the transient DC bus voltage $V_{dc}$.

From the formula (8), it is known that the operation of voltage limitation is to limit the stator flux.

$$\lambda_{lim} = \frac{\sqrt{V_{smax}^2 - (R_s \cdot i_{sd})^2} - R_s \cdot \left| i_{qs} \right|}{|\omega|} \cong \frac{V_{s,max} - R_s \cdot |i_{qs}|}{|\omega|} \tag{9}$$

$$V_{s,max} = V_{dc} / \sqrt{3}$$

Figure 15:
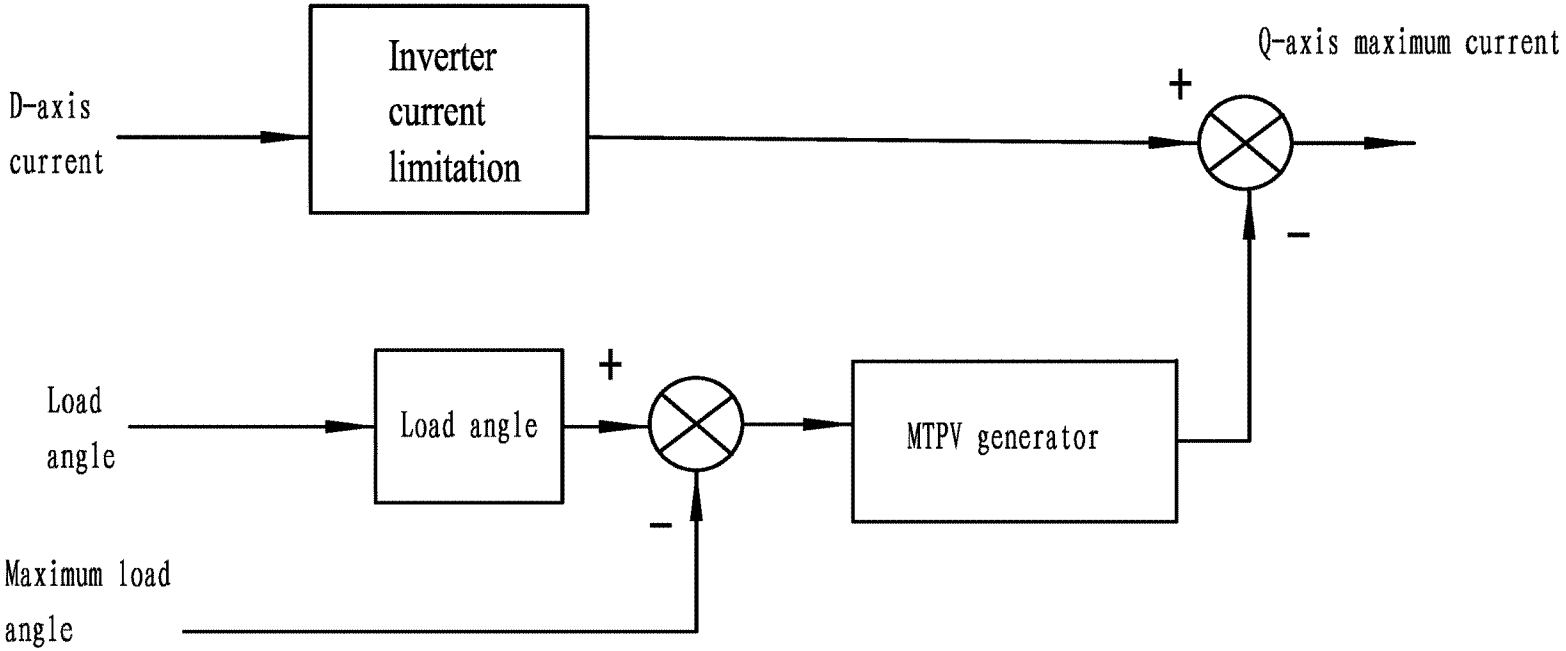
FIG. 15 is a flow chart of a direct stator flux vector controlling the production of a q-axis maximum current.

As shown in FIG. 15, a block diagram for producing a maximum q-axis current, and limitations of the current and the load angle in the MTPV control strategy of the lifting torque is shown. In order to transmit the required torque, the q-axis current is calculated from the torque/current production module in FIG. 10. However, the q-axis current is limited by the maximum current of the frequency inverter. The required current of the q-axis is bidirectionally controlled by the current limiter.

The q-axis current is limited by the maximum current of the frequency inverter, and the maximum current of the q-axis $q_s$ is defined as:

$$i_{qs,max} \leq \sqrt{I_{s,max}^2 - i_{ds}^2} \tag{10}$$

the $i_{ds}$ is the stator current of the $d_s$-axis.

In process of increasing the torque under high speed, the optimal control strategy is to maximize efficiency of the usable phase voltage to achieve a lowest current. In order to realize the strategy, the conditions for motor operation requiring to open or close the maximum load angle are defined as MTPV operation. The maximum load angle is acquired by the analyses of the load angle, which comprises an imitation and an acceleration test. The determination of the maximum load angle improves the stability of the motor, which is like the limitation of the load angle. As shown in FIG. 15, the limitation of the load angle is accomplished by the PI controller, thus the maximum allowable current is lowered.

Figure 16:
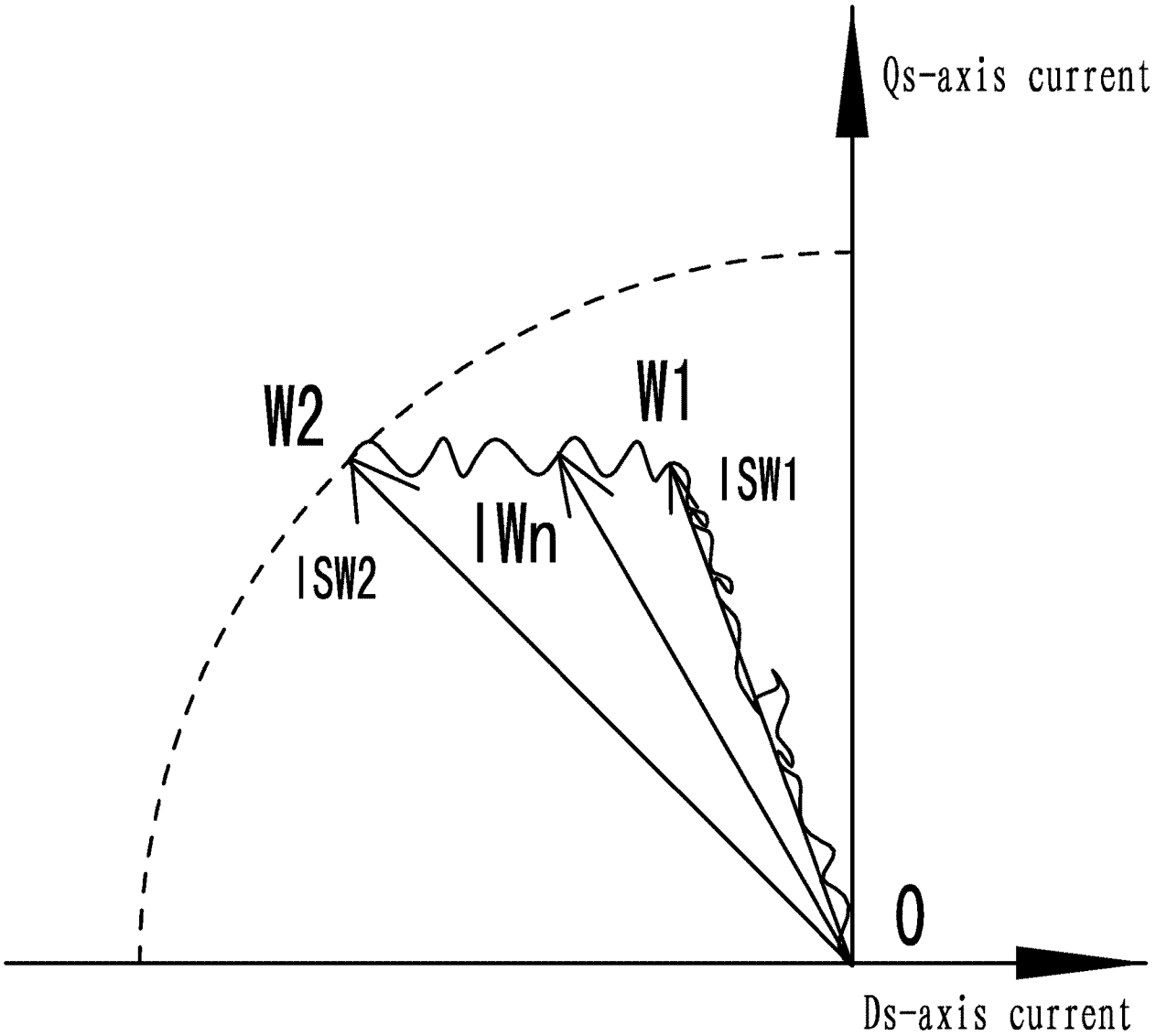
FIG. 16 is a diagram of a vector control method in accordance with one embodiment of the invention.

As shown in FIG. 16, in a low speed range, the motor controller is in an operating mode of MTPA, a section of the curve is labeled as (0, W1), and the current vector is ISW1. As the speed increases, the frequency inverter becomes saturated, the motor operates in a curve of MTPV operating mode, that is, the section (W1, W2), and the current vector is W2. Thus, the maximum torque and rotational speed is achieved, and the control mode is efficient and energy saving. The current vector IWn is a current transition vector from W1 to W2. As shown in FIG. 16, the section of the curve is very short, which means, the transition part is very efficient, and energy-saving.

Descriptions of FIGS. 9-16 are specifically summarized in some textbooks, and will not be summarized herein.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A blower system, comprising:

a) a permanent magnet motor, the permanent magnet motor comprising a stator assembly comprising a winding, a rotor assembly, and a motor controller; and b) a wind wheel driven by the permanent magnet motor; wherein the rotor assembly comprises a salient pole rotor comprising a rotor core and magnets embedded in the rotor core;

the motor controller [employs a sensorless vector control mode and] comprises a microprocessor *having a direct stator flux vector control* (*SFVC*) *module*, a frequency inverter, and a sensor unit; *wherein, the direct SFVC module is adapted to adjust a d-axis voltage $V_d$ of the motor in a rotor coordinate according to flux in the stator assembly;* the sensor unit inputs a phase current or phase currents, a phase voltage, and a DC bus voltage into the microprocessor, and the microprocessor outputs a signal to control the frequency inverter;

the frequency inverter is connected to the winding of the stator assembly; and a ratio between an air gap of the motor and a thickness of the magnets ranges from 0.03 to 0.065, and a ratio between a length of a pole arc and a length of the magnets ranges from 0.8 to 1.0.

2. The blower system of claim 1, wherein the rotor core comprises an annular ring comprising a central axial bore, and a plurality of magnetic induction blocks protruding outwards from an outer side of the annular ring;

between two adjacent magnetic induction blocks is formed a radial recess for receiving permanent magnets; and a hook block protrudes from the magnetic induction blocks at both sides of an opening of the radial recess.

3. The blower system of claim 2, wherein a section of an outer side surface of the magnetic induction blocks is a circular-arc line; and the outer side surface employs a point with a distance deviating from the center of the central axial bore as a center of circle.

4. The blower system of claim 3, wherein a number of magnetic poles of the rotor is 8, 10, or 12.

5. A method for controlling a blower system, the system comprising a permanent magnet motor and a wind wheel driven by the permanent magnet motor; the permanent magnet motor comprising a stator assembly comprising a winding, a rotor assembly, and a motor controller; the rotor assembly being a salient pole rotor comprising a rotor core and magnets embedded in the rotor core; [the motor controller employing a sensorless vector control mode,] the motor controller comprising a microprocessor, a frequency inverter, and a sensor unit; the sensor unit inputting a phase current or phase currents, a phase voltage, and a DC bus voltage into the microprocessor, and the microprocessor outputting a signal to control the frequency inverter, the frequency inverter being connected to the winding of the stator assembly; a ratio between an air gap of the motor and a thickness of the magnets ranging from 0.03 to 0.065, and a ratio between a length of a pole arc and a length of the magnets ranging from 0.8 to 1.0; a number of magnetic poles of the rotor is 8, 10, or 12; and the method comprising:

providing the microprocessor with a torque current control module and a direct stator flux vector control (SFVC) module, detecting operating parameters and operating conditions of the motor by the microprocessor, calculating and determining whether the frequency inverter is in a saturated state; *wherein, the direct SFVC module is adapted to adjust a d-axis voltage $V_d$ of the motor in a rotor coordinate according to flux in the stator assembly;* and controlling the operation of the motor by the torque current control module if the frequency inverter is not saturated; or controlling the operation of the motor by the direct SFVC module if the frequency inverter is saturated.

6. The method of claim 5, wherein the torque current control module works in an operating mode of a maximum torque per ampere (MTPA).

7. The method of claim 5, wherein the direct SFVC module works in an operating mode of a maximum torque per volt (MTPV).

8. The method of claim 5, wherein the microprocessor further comprises a stator flux observer by which a flux, a flux angle, and a load angle are calculated and input into the direct SFVC module.

9. A method for controlling a blower system, the system comprising a permanent magnet motor and a wind wheel driven by the permanent magnet motor; the permanent magnet motor comprising a stator assembly comprising a winding, a rotor assembly, and a motor controller; the rotor assembly being a salient pole rotor comprising a rotor core and magnets embedded in the rotor core; [the motor controller employing a sensorless vector control mode,] the motor controller comprising a microprocessor, a frequency inverter, and a sensor unit; the sensor unit inputting a phase current or phase currents, a phase voltage, and a DC bus voltage into the microprocessor, and the microprocessor outputting a signal to control the frequency inverter, the frequency inverter being connected to the winding of the stator assembly; a ratio between an air gap of the motor and a thickness of the magnets ranging from 0.03 to 0.065, and a ratio between a length of a pole arc and a length of the magnets ranging from 0.8 to 1.0; a number of magnetic poles of the rotor is 8, 10, or 12; and the method comprising steps as follows:

1) determining a critical speed S1 at the moment the frequency inverter is saturated, and inputting the critical speed S1 to the microprocessor;

2) providing the microprocessor with a torque current control module and a direct SFVC module, detecting whether an actual speed S is higher than the critical speed S1 by the microprocessor; and 3) controlling the operation of the motor by the torque current control module if the actual speed S is no higher than the critical speed S1; or 4) controlling the operation of the motor by the direct SFVC module if the actual speed S is higher than the critical speed S1.

10. A method for controlling a blower system, the system comprising a permanent magnet motor and a wind wheel driven by the permanent magnet motor; the permanent magnet motor comprising a stator assembly comprising a winding, a rotor assembly, and a motor controller; the rotor assembly being a salient pole rotor comprising a rotor core and magnets embedded in the rotor core; [the motor controller employing a sensorless vector control mode,] the motor controller comprising a microprocessor, a frequency inverter, and a sensor unit; the sensor unit inputting a phase current or phase currents, a phase voltage, and a DC bus voltage into the microprocessor, and the microprocessor outputting a signal to control the frequency inverter, the frequency inverter being connected to the winding of the stator assembly; a ratio between an air gap of the motor and a thickness of the magnets ranging from 0.03 to 0.065, and a ratio between a length of a pole arc and a length of the magnets ranging from 0.8 to 1.0; a number of magnetic poles of the rotor is 8, 10, or 12; and the method comprising steps as follows:

1) determining a critical torque T1 at the moment the frequency inverter is saturated, and inputting the critical torque T1 to the microprocessor;

2) providing the microprocessor with a torque current control module and a direct SFVC module, detecting whether an required torque T is larger than the critical torque T1 by the microprocessor; and 3) controlling the operation of the motor by the torque current control module if the required torque T is no larger than the critical torque T1; or 4) controlling the operation of the motor by the direct SFVC module if the required torque T is larger than the critical torque T1.

11. A method for controlling a blower system, the system comprising a permanent magnet motor and a wind wheel driven by the permanent magnet motor; the permanent magnet motor comprising a stator assembly comprising a winding, a rotor assembly, and a motor controller; the rotor assembly being a salient pole rotor comprising a rotor core and magnets embedded in the rotor core; [the motor controller employing a sensorless vector control mode,] the motor controller comprising a microprocessor, a frequency inverter, and a sensor unit; the sensor unit inputting a phase current or phase currents, a phase voltage, and a DC bus voltage into the microprocessor, and the microprocessor outputting a signal to control the frequency inverter, the frequency inverter being connected to the winding of the stator assembly; a ratio between an air gap of the motor and a thickness of the magnets ranging from 0.03 to 0.065, and a ratio between a length of a pole arc and a length of the magnets ranging from 0.8 to 1.0; a number of magnetic poles of the rotor is 8, 10, or 12; the microprocessor comprising a torque current control module, a direct SFVC module, and a stator flux observer; and the method comprising steps as follows:

1) reading a required torque;
2) determining [ad-axis] *a d-axis* inductance $L_d$, and a q-axis inductance $L_q$ [in the state of magnetic saturation];
3) outputting a stator flux, a flux angle, and a load angle by the stator flux observer;
4) calculating a reference flux based on an operating mode of a maximum torque per ampere (MTPA);
5) calculating a limited flux based on an operating mode of a maximum torque per volt (MTPV);
6) determining whether the limited flux is larger than the reference flux;
7) calculating the voltage $V_q$ according to the requirement of the torque, and calculating the voltage $V_d$ in the operating mode of MTPA if the limited flux is larger than the reference flux and the frequency inverter is not saturated; or calculating the voltage $V_q$ according to the requirement of the torque, and calculating the voltage $V_d$ in the operating mode of MTPV if the limited flux is no larger than the reference flux; and
8) converting the voltages $V_d$ and $V_q$ into voltages $V_\alpha$ and $V_\beta$ in a stationary coordinate, converting the voltages $V_\alpha$ and $V_\beta$ in the stationary coordinate into three-phase voltages $V_a$, $V_b$, and $V_c$, and modulating a PWM using the three-phase voltages $V_a$, $V_b$, and $V_c$.

* * * * *